(12) United States Patent
Ying et al.

(10) Patent No.: US 10,999,881 B2
(45) Date of Patent: May 4, 2021

(54) SESSION MANAGEMENT METHOD AND DEVICE

(71) Applicant: HUAWEI TECHNOLOGIES CO., LTD., Guangdong (CN)

(72) Inventors: Jiangwei Ying, Beijing (CN); Yanmei Yang, Beijing (CN); Zhenglei Huang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/281,784

(22) Filed: Feb. 21, 2019

(65) Prior Publication Data

US 2019/0182876 A1 Jun. 13, 2019

Related U.S. Application Data

(63) Continuation of application No. PCT/CN2016/096436, filed on Aug. 23, 2016.

(51) Int. Cl.
*H04W 36/00* (2009.01)
*H04W 4/00* (2018.01)
(Continued)

(52) U.S. Cl.
CPC ............ *H04W 76/12* (2018.02); *H04W 8/06* (2013.01); *H04W 8/22* (2013.01);
(Continued)

(58) Field of Classification Search
CPC .. H04W 76/12; H04W 36/0033; H04W 60/04
(Continued)

(56) References Cited

U.S. PATENT DOCUMENTS

| | | | |
|---|---|---|---|
| 2005/0010925 A1* | 1/2005 | Khawand | H04L 69/32 719/310 |
| 2005/0027824 A1* | 2/2005 | Khawand | G06F 9/544 709/219 |

(Continued)

FOREIGN PATENT DOCUMENTS

| | | |
|---|---|---|
| CN | 101646270 A | 2/2010 |
| CN | 103731811 A | 4/2014 |
| CN | 104080123 A | 10/2014 |

OTHER PUBLICATIONS

3GPP TS 23.401 V14.0.0 (Jun. 2016),3rd Generation Partnership Project;Technical Specification Group Services and System Aspects;General Packet Radio Service (GPRS) enhancements for Evolved Universal Terrestrial Radio Access Network (E-UTRAN) access(Release 14),total 374 pages. XP051123221.

(Continued)

*Primary Examiner* — Mark G. Pannell
(74) *Attorney, Agent, or Firm* — Womble Bond Dickinson (US) LLP

(57) ABSTRACT

Embodiments of the present disclosure provide a session management method and an apparatus. The method includes: receiving, by a first session management SM entity, first session context information from a second SM entity; further, generating, by the first SM entity, second session context information based on the first session context information; and sending the second session context information to a terminal. As can be learned, a session in a tracking area update procedure of the terminal is updated in a scenario in which an MM entity and an SM entity are separated.

7 Claims, 16 Drawing Sheets

(51) Int. Cl.
*H04W 76/12* (2018.01)
*H04W 8/22* (2009.01)
*H04W 8/06* (2009.01)
*H04W 60/04* (2009.01)
*H04W 60/00* (2009.01)
*H04W 76/25* (2018.01)

(52) U.S. Cl.
CPC ....... *H04W 36/0033* (2013.01); *H04W 60/04* (2013.01); *H04W 60/00* (2013.01); *H04W 76/25* (2018.02)

(58) Field of Classification Search
USPC ........................................................ 455/437
See application file for complete search history.

(56) References Cited

U.S. PATENT DOCUMENTS

| | | | | |
|---|---|---|---|---|
| 2005/0201345 | A1* | 9/2005 | Williamson | G16H 40/63 370/338 |
| 2008/0089293 | A1* | 4/2008 | Madour | H04W 36/0016 370/331 |
| 2009/0129342 | A1* | 5/2009 | Hwang | H04W 36/0022 370/331 |
| 2010/0167740 | A1* | 7/2010 | Vakil | H04W 36/0083 455/436 |
| 2010/0278108 | A1* | 11/2010 | Cho | H04W 76/12 370/328 |
| 2010/0323700 | A1* | 12/2010 | Bachmann | H04W 36/0066 455/436 |
| 2011/0188451 | A1 | 8/2011 | Song et al. | |
| 2014/0160938 | A1* | 6/2014 | Qu | H04W 8/065 370/236 |
| 2015/0065106 | A1 | 3/2015 | Catovic et al. | |
| 2015/0282017 | A1 | 10/2015 | Wang et al. | |
| 2015/0305085 | A1* | 10/2015 | Huang | H04W 8/082 370/328 |
| 2018/0042057 | A1* | 2/2018 | Johansson | H04W 76/10 |
| 2019/0223060 | A1* | 7/2019 | Zhou | H04W 36/0022 |

OTHER PUBLICATIONS

3GPP TR 23.799 V0.7.0 (Aug. 2016),3rd Generation Partnership Project;Technical Specification Group Services and System Aspects;Study on Architecture for Next Generation System(Release 14),total 323 pages. XP051172366.

* cited by examiner

SESSION MANAGEMENT METHOD AND DEVICE

CROSS-REFERENCE TO RELATED APPLICATIONS

This application is a continuation of International Application No. PCT/CN2016/096436, filed on Aug. 23, 2016, the disclosure of which is hereby incorporated by reference in its entirety.

TECHNICAL FIELD

Embodiments of the present disclosure relate to the field of communications technologies, and in particular, to a session management method and an apparatus.

BACKGROUND

As mobile communications technologies are upgraded, more innovative applications are provided for various industries, and mobile broadband, multimedia, machine type communication (MTC), industrial control, and intelligent transportation systems (ITS) will become main use cases in the 5G era. To meet widely changing service requirements, a 5G network is to be constructed flexibly. A potential construction direction is network function separation, to be specific, a control plane (CP) function and a user plane UP function are separated, and a mobility management (MM) function and a session management SM function in a CP are separated. For example, a network slice technology in 5G is used to slice a physical network into a plurality of virtual end-to-end virtual networks (that is, network slices), and each network slice includes an independent network function or an instantiated function combination.

Usually, a network slice includes a control plane function (CPF) entity and a user plane function (UPF) entity. The CPF entity mainly performs mobility management (MM) functions such as device access authentication, security encryption, and location registration, and session management (SM) functions such as establishment, release, and modification of a user plane transmission path. The UPF function entity mainly performs functions such as routing and forwarding of user plane data. FIG. 1 is a schematic architectural diagram of a network slice. As shown in FIG. 1, a plurality of network slices (for ease of description, two network slices are used as an example in FIG. 1) share only some specific CPF function entities (for example, an MM entity), and each network slice has some independent CPF function entities (for example, an SM entity) and an independent UPF entity. In other words, the MM entity and the SM entity are separated.

However, an existing tracking area update procedure is applicable to only a scenario in which an MM entity and an SM entity are not separated (for example, the SM entity and the MM entity are integrated in a same network function node). How to perform a tracking area procedure (for example, session update) in a scenario in which an MM entity and an SM entity are separated is a technical problem that needs to be resolved in this application.

SUMMARY

Embodiments of the present disclosure provide a session management method and an apparatus, to update a session in a tracking area update procedure of a terminal in a scenario in which an MM entity and an SM entity are separated.

According to a first aspect, an embodiment of the present disclosure provides a session management method, including:

receiving, by a first session management SM entity, first session context information from a second SM entity;

generating, by the first SM entity, second session context information based on the first session context information; and sending, by the first SM entity, the second session context information to a terminal.

In the session management method provided in the first aspect, the first session management SM entity receives the first session context information from the second SM entity, and generates the second session context information based on the first session context information. Further, the first SM entity sends the second session context information to the terminal. As can be learned, a session in a tracking area update procedure of the terminal is updated in a scenario in which an MM entity and an SM entity are separated.

In a possible design, before the receiving, by a first SM entity, first session context information from a second SM entity, the method further includes: sending, by the first SM entity, a session context request to the second SM entity, where the session context request includes an identifier of the terminal.

In a possible design, before the receiving, by a first SM entity, first session context information from a second SM entity, the method further includes: receiving, by the first SM entity, a session context update request from the terminal, where the session context update request includes the identifier of the terminal and/or an identifier of the second SM entity.

In a possible design, the receiving, by a first SM entity, first session context information from a second SM entity includes: receiving, by the first SM entity, a first SM relocation request from the second SM entity, where the first SM relocation request includes the first session context information.

In a possible design, before the receiving, by a first SM entity, first session context information from a second SM entity, the method further includes: receiving, by the first SM entity, a second SM relocation request from a target mobility management (MM) entity, where the second SM relocation request includes the identifier of the terminal.

In a possible design, the session management method is applied to a tracking area update procedure.

According to a second aspect, an embodiment of the present disclosure provides a session management method, including:

sending, by a terminal, a session context update request to a first session management SM entity, where the session context update request includes an identifier of the terminal; and receiving, by the terminal, second session context information from the first SM entity and storing the second session context information, where the second session context information is new session context information generated by the first SM entity based on first session context information obtained from a second SM entity.

In the session management method provided in the second aspect, the terminal sends the session context update request to the first SM entity, receives the second session context information (where the second session context information is new session context information generated by the first SM entity based on the first session context information obtained from the second SM entity) from the first SM entity, and stores the second session context information. As can be learned, a session in a tracking area update procedure of the terminal is updated in a scenario in which an MM entity and an SM entity are separated.

In a possible design, before the sending, by a terminal, a session context update request to a first SM entity, the method further includes:

obtaining, by the terminal, a tracking area identifier of a location of the terminal, where the tracking area identifier includes an identifier that is of a first SM entity and that corresponds to the current location; and determining, by the terminal based on the tracking area identifier, that the identifier of the first SM entity is not an identifier of the second SM entity previously connected to the terminal.

In a possible design, before the sending, by a terminal, a session context update request to a first SM entity, the method further includes: receiving, by the terminal, an identifier of the first SM entity from a radio access network (RAN) device or a target mobility management (MM) entity.

In a possible design, before the sending, by a terminal, a session context update request to a first SM entity, the method further includes: triggering, by the terminal, a tracking area update procedure.

According to a third aspect, an embodiment of the present disclosure provides a session management method, including:

receiving, by a radio access network (RAN) device, an identifier of a second session management SM entity from a terminal;

determining, by the RAN device based on preset policy information and the identifier of the second SM entity, whether to replace an SM entity for the terminal, where the second SM entity is an SM entity for maintaining historical session context information of the terminal; and if yes, selecting, by the RAN device, a first SM entity based on the preset policy information.

In the session management method provided in the third aspect, the RAN device receives the identifier of the second SM entity from the terminal; further, determines, based on the preset policy information and the identifier of the second SM entity, whether to replace the SM entity for the terminal, and if yes, selects the first SM entity based on the preset policy information. As can be learned, a session in a tracking area update procedure of the terminal is updated in a scenario in which an MM entity and an SM entity are separated.

In a possible design, the receiving, by an RAN device, an identifier of a second SM entity from a terminal includes:

receiving, by the RAN device, a first RRC request message from the terminal, where the first RRC request message includes a session context update request and the identifier of the second SM entity.

In a possible design, after the selecting, by the RAN device, a first SM entity based on the preset policy information, the method further includes: sending, by the RAN device, the session context update request to the first SM entity.

In a possible design, the receiving, by an RAN device, an identifier of a second SM entity from a terminal includes:

receiving, by the RAN device, a second RRC request message from the terminal, where the second RRC request message includes the identifier of the second SM entity.

In a possible design, after the selecting, by the RAN device, a first SM entity based on the preset policy information, the method further includes:

sending, by the RAN device, an identifier of the first SM entity to the terminal, so that the terminal sends a session context update request to the first SM entity based on the identifier of the first SM entity.

According to a fourth aspect, an embodiment of the present disclosure provides a session management method, including:

receiving, by a target mobility management (MM) entity, a tracking area update request from a terminal;

determining, by the target MM entity based on preset policy information, an identifier of a second session management SM entity, and location information of the terminal, whether to replace an SM entity for the terminal, where the second SM entity is an SM entity for maintaining historical session context information of the terminal; and if yes, selecting, by the target MM entity, a first SM entity based on the preset policy information.

In the session management method provided in the fourth aspect, after receiving the tracking area update request from the terminal, the target MM entity determines, based on the preset policy information, the identifier of the second SM entity, and the location information of the terminal, whether to replace the SM entity for the terminal, and if yes, selects the first SM entity based on the preset policy information. As can be learned, a session in a tracking area update procedure of the terminal is updated in a scenario in which an MM entity and an SM entity are separated.

In a possible design, after the selecting, by the target MM entity, a first SM entity based on the preset policy information, the method further includes:

sending, by the target MM entity, an identifier of the first SM entity to the terminal, so that the terminal sends a session context update request to the first SM entity based on the identifier of the first SM entity; or sending, by the target MM entity, a second SM relocation request to the first SM entity, so that the first SM entity requests to obtain first session context information from the second SM entity, where the second SM relocation request includes an identifier of the terminal.

According to a fifth aspect, an embodiment of the present disclosure provides a session management method, including:

obtaining, by a target mobility management (MM) entity, location information of a terminal; and sending, by the target MM entity, the location information of the terminal to a second session management SM entity, so that the second SM entity determines, based on preset policy information and the location information of the terminal, whether to replace an SM entity for the terminal, where the second SM entity is an SM entity for maintaining historical session context information of the terminal.

In the session management method provided in the fifth aspect, the target MM entity obtains the location information of the terminal, and sends the location information of the terminal to the second SM entity, so that the second SM entity determines, based on the preset policy information and the location information of the terminal, whether to replace the SM entity for the terminal, to select an appropriate SM entity. As can be learned, a session in a tracking area update procedure of the terminal is updated in a scenario in which an MM entity and an SM entity are separated.

In a possible design, before the sending, by the target MM entity, the location information of the terminal to a second SM entity, the method further includes:

receiving, by the target MM entity, SM subscription information from a source MM entity, where the SM subscription information is: if the terminal triggers a tracking area update procedure, notifying the location information of the terminal to the second SM entity.

In a possible design, the sending, by the target MM entity, the location information of the terminal to a second SM entity includes:

sending, by the target MM entity, the location information of the terminal to a source MM entity, so that the source MM entity forwards the location information of the terminal to the second SM entity.

According to a sixth aspect, an embodiment of the present disclosure provides a tracking area update method, including:

receiving, by a second session management SM entity, an identifier of a terminal and location information of the terminal from a mobility management (MM) entity, where the MM entity is a source MM entity or a target MM entity;

determining, by the second SM entity based on preset policy information and the location information of the terminal, whether to replace an SM entity for the terminal; and if yes, selecting, by the second SM entity, a first SM entity based on the preset policy information, and sending first session context information to the first SM entity, so that the first SM entity generates second session context information based on the first session context information.

In the session management method provided in the sixth aspect, the second SM entity receives the identifier of the terminal and the location information of the terminal from the MM entity (where the MM entity is a source MM entity or a target MM entity); further, determines, based on the preset policy information and the location information of the terminal, whether to replace the SM entity for the terminal; and if yes, selects the first SM entity based on the preset policy information, and sends the first session context information to the first SM entity, so that the first SM entity generates the second session context information based on the first session context information. As can be learned, a session in a tracking area update procedure of the terminal is updated in a scenario in which an MM entity and an SM entity are separated.

According to a seventh aspect, an embodiment of the present disclosure provides a first session management SM entity, including:

a first receiving module, configured to receive first session context information from a second SM entity;

a generation module, configured to generate second session context information based on the first session context information; and a first sending module, configured to send the second session context information to a terminal.

In a possible design, the first SM entity further includes:
a second sending module, configured to send a session context request to the second SM entity, where the session context request includes an identifier of the terminal.

In a possible design, the first SM entity further includes:
a second receiving module, configured to receive a session context update request from the terminal, where the session context update request includes the identifier of the terminal and/or an identifier of the second SM entity.

In a possible design, the first receiving module is specifically configured to receive a first SM relocation request from the second SM entity, where the first SM relocation request includes the first session context information.

In a possible design, the first SM entity further includes:
a third receiving module, configured to receive a second SM relocation request from a target mobility management (MM) entity, where the second SM relocation request includes the identifier of the terminal.

For beneficial effects of the first SM entity provided in the seventh aspect and the possible implementations of the seventh aspect, refer to beneficial effects of the possible implementations of the first aspect. Details are not described herein again.

According to an eighth aspect, an embodiment of the present disclosure provides a terminal, including:

a sending module, configured to send a session context update request to a first session management SM entity, where the session context update request includes an identifier of the terminal; and a first receiving module, configured to: receive second session context information from the first SM entity and store the second session context information, where the second session context information is new session context information generated by the first SM entity based on first session context information obtained from a second SM entity.

In a possible design, the terminal further includes:
an obtaining module, configured to obtain a tracking area identifier of a location of the terminal, where the tracking area identifier includes an identifier that is of a first SM entity and that corresponds to the current location; and
a determining module, configured to determine, based on the tracking area identifier, that the identifier of the first SM entity is not an identifier of the second SM entity previously connected to the terminal.

In a possible design, the terminal further includes:
a second receiving module, configured to receive an identifier of the first SM entity from a radio access network (RAN) device or a target mobility management (MM) entity.

In a possible design, the terminal further includes:
a triggering module, configured to trigger a tracking area update procedure.

For beneficial effects of the terminal provided in the eighth aspect and the possible implementations of the eighth aspect, refer to beneficial effects of the possible implementations of the second aspect. Details are not described herein again.

According to a ninth aspect, an embodiment of the present disclosure provides a radio access network (RAN) device, including:

a receiving module, configured to receive an identifier of a second session management SM entity from a terminal;

a judging module, configured to determine, based on preset policy information and the identifier of the second SM entity, whether to replace an SM entity for the terminal, where the second SM entity is an SM entity for maintaining historical session context information of the terminal; and a selection module, configured to select a first SM entity based on the preset policy information if the judging module determines that an SM entity needs to be replaced for the terminal.

In a possible design, the receiving module is specifically configured to receive a first RRC request message from the terminal, where the first RRC request message includes a session context update request and the identifier of the second SM entity.

In a possible design, the RAN device further includes:
a first sending module, configured to send the session context update request to the first SM entity.

In a possible design, the receiving module is specifically configured to receive a second RRC request message from the terminal, where the second RRC request message includes the identifier of the second SM entity.

In a possible design, the RAN device further includes:

a second sending module, configured to send an identifier of the first SM entity to the terminal, so that the terminal sends a session context update request to the first SM entity based on the identifier of the first SM entity.

For beneficial effects of the RAN device provided in the ninth aspect and the possible implementations of the ninth aspect, refer to beneficial effects of the possible implementations of the third aspect. Details are not described herein again.

According to a tenth aspect, an embodiment of the present disclosure provides a target mobility management (MM) entity, including:

a receiving module, configured to receive a tracking area update request from a terminal;

a judging module, configured to determine, based on preset policy information, an identifier of a second session management SM entity, and location information of the terminal, whether to replace an SM entity for the terminal, where the second SM entity is an SM entity for maintaining historical session context information of the terminal; and a selection module, configured to select a first SM entity based on the preset policy information if the judging module determines that an SM entity needs to be replaced for the terminal.

In a possible design, the target MM entity further includes:

a first sending module, configured to send an identifier of the first SM entity to the terminal, so that the terminal sends a session context update request to the first SM entity based on the identifier of the first SM entity; or a second sending module, configured to send a second SM relocation request to the first SM entity, so that the first SM entity requests to obtain first session context information from the second SM entity, where the second SM relocation request includes an identifier of the terminal.

For beneficial effects of the target MM entity provided in the tenth aspect and the possible implementations of the tenth aspect, refer to beneficial effects of the possible implementations of the fourth aspect. Details are not described herein again.

According to an eleventh aspect, an embodiment of the present disclosure provides a target mobility management (MM) entity, including:

an obtaining module, configured to obtain location information of a terminal; and a sending module, configured to send the location information of the terminal to a second session management SM entity, so that the second SM entity determines, based on preset policy information and the location information of the terminal, whether to replace an SM entity for the terminal, where the second SM entity is an SM entity for maintaining historical session context information of the terminal.

In a possible design, the target MM entity further includes:

a receiving module, configured to receive SM subscription information from a source MM entity, where the SM subscription information is: if the terminal triggers a tracking area update procedure, notifying the location information of the terminal to the second SM entity.

In a possible design, the sending module is specifically configured to send the location information of the terminal to a source MM entity, so that the source MM entity forwards the location information of the terminal to the second SM entity.

For beneficial effects of the target MM entity provided in the eleventh aspect and the possible implementations of the eleventh aspect, refer to beneficial effects of the possible implementations of the fifth aspect. Details are not described herein again.

According to a twelfth aspect, an embodiment of the present disclosure provides a second session management SM entity, including:

a receiving module, configured to receive an identifier of a terminal and location information of the terminal from a mobility management (MM) entity, where the MM entity is a source MM entity or a target MM entity;

a judging module, configured to determine, based on preset policy information and the location information of the terminal, whether to replace an SM entity for the terminal;

a selection module, configured to select a first SM entity based on the preset policy information if the judging module determines that an SM entity needs to be replaced for the terminal; and a sending module, configured to send first session context information to the first SM entity, so that the first SM entity generates second session context information based on the first session context information.

For beneficial effects of the second SM entity provided in the twelfth aspect and the possible implementations of the twelfth aspect, refer to beneficial effects of the possible implementations of the sixth aspect. Details are not described herein again.

DESCRIPTION OF EMBODIMENTS

Figure 1:
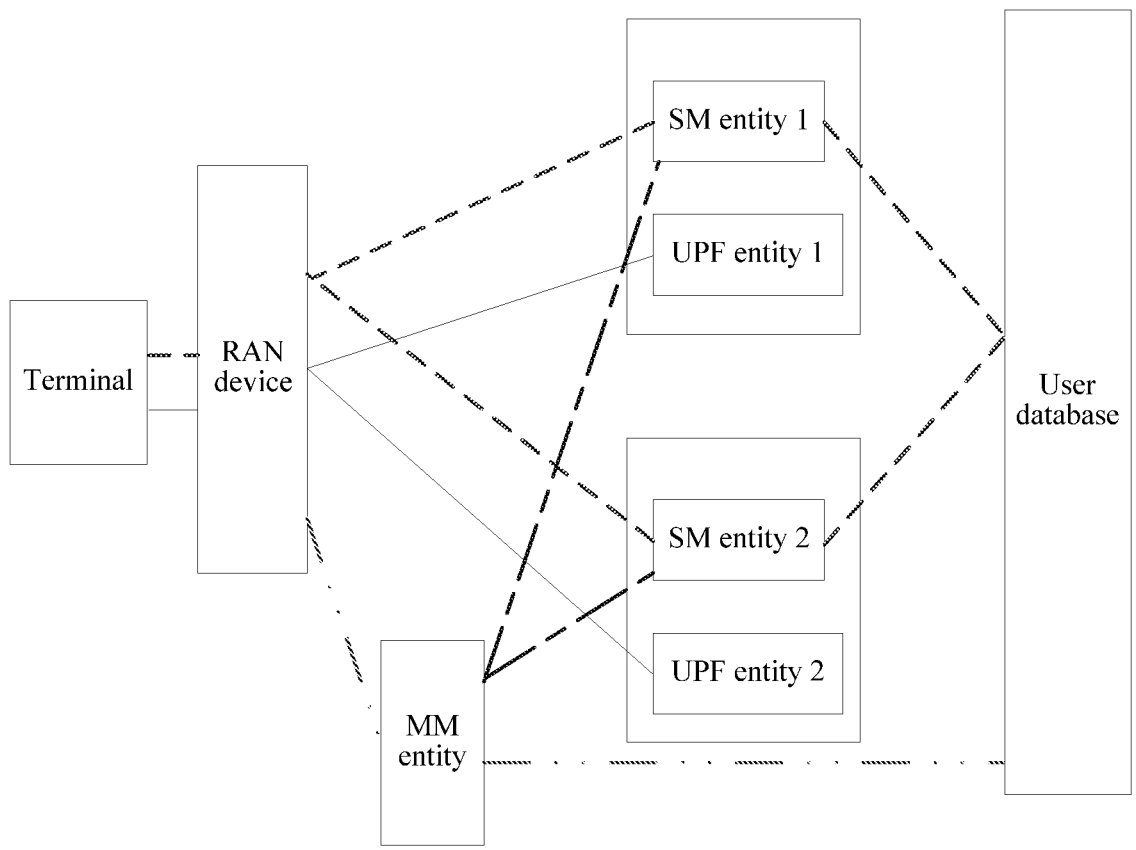
FIG. 1 is a schematic architectural diagram of a network slice.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by persons of ordinary skill in the art based on the embodiments of the present disclosure without creative efforts shall fall within the protection scope of the present disclosure.

A terminal, namely, user equipment (UE), in this application may be a wireless terminal or a wired terminal. The wireless terminal may refer to a device that provides a user with voice and/or data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, an access point, a remote terminal, an access terminal, a user terminal, a user agent, a user device, or a user equipment.

A first SM entity in this application is an SM entity for maintaining current session context information of the terminal. A second SM entity in this application is an SM entity for maintaining historical session context information of the terminal. In one embodiment, the first SM entity and the second SM entity in the embodiments of this application each may be a device disposed on a network side, such as an SM function device or a network slice-specific function device, or each may be a function module in the foregoing devices on the network side.

A target MM entity and a source target MM entity in this application each may be a device disposed on the network side, such as an MM function device or a general function device, or each may be a function module in the foregoing devices on the network side.

A radio access network (RAN) device in this application may be a device independently disposed on an RAN side, such as a base station or a radio network controller (RNC), or may be a function module in the foregoing devices on the radio access network side. In one embodiment, the RAN device can sense location information of the terminal.

A first UPF entity in this application is a function entity on the network side, and a second UPF entity in this application is a function entity on the network side. The first UPF entity and the second UPF entity in this application each may be a device disposed on the network side, such as a user plane function device or a gateway user plane function device, or each may be a function module in the foregoing devices on the network side.

The terminal obtains a tracking area list from an mobility management entity (MME). In one embodiment, when the terminal is in an idle state, when a tracking area in which the terminal is currently located does not fall within the tracking area list due to a location change caused by movement of the terminal, the terminal triggers a tracking area update procedure (for example, including terminal location update or session update). In one embodiment, the terminal may alternatively trigger a tracking area update procedure periodically. A main objective of triggering the tracking area update procedure is as follows: When the terminal is in the idle state, a network is still accessible for the terminal. To be specific, when there is downlink data of the terminal, a core network device can page the terminal.

However, an existing tracking area update procedure is applicable only to a scenario in which an MM entity and an SM entity are not separated (for example, the SM entity and the MM entity are integrated in a same network function node such as an MME). How to perform a tracking area update (for example, session update) procedure in a scenario in which an MM entity and an SM entity are separated (as shown in FIG. 1) is a technical problem that needs to be resolved in this application.

As shown in FIG. 1, there is a signaling interface between an RAN device and an MM entity, there is a data plane interface between the RAN device and a UPF entity, and there is a signaling interface between a user database and the MM entity. In one embodiment, there may be a signaling interface between the user database and an SM entity, and there may alternatively be a signaling interface between the MM entity and each SM entity. In one embodiment, there may be a signaling interface between the RAN device and the SM entity, or there is no direct interface between the RAN device and the SM entity, and signaling between the RAN device and the SM entity needs to be forwarded by the MM entity.

The embodiments of this application are applied to a tracking area update procedure in a 5G communications system, thereby implementing session update, terminal location update, and the like in a scenario in which an MM entity and an SM entity are separated.

A session management method and an apparatus provided in the embodiments of the present disclosure are described in detail below with reference to the accompanying drawings by using specific embodiments.

Figure 2:
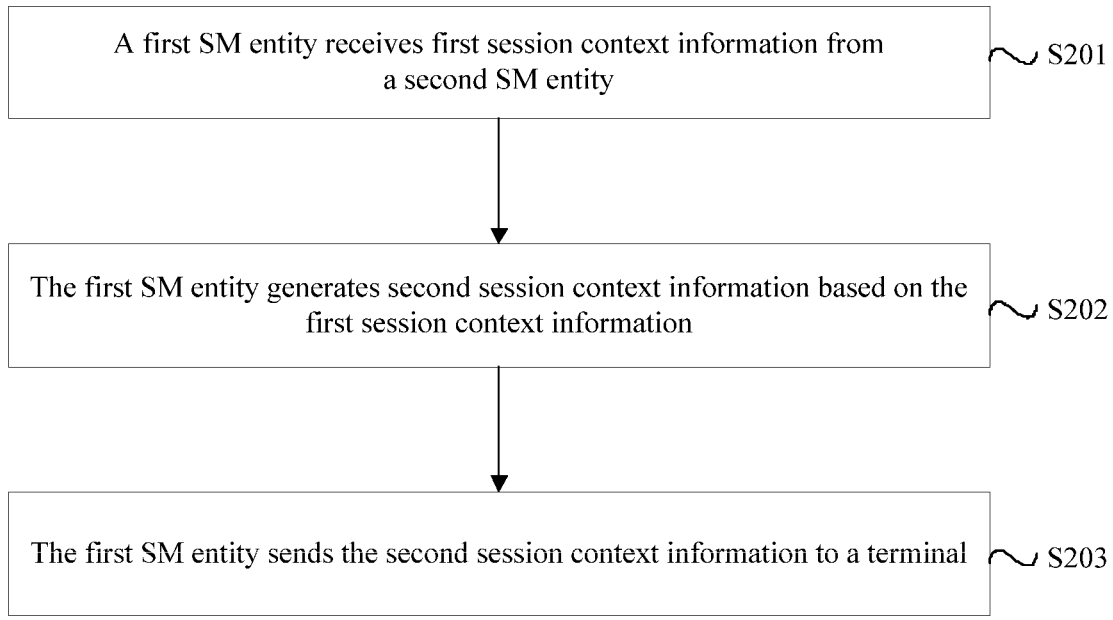
FIG. 2 is a schematic flowchart of Embodiment 1 of a session management method according to the present disclosure.

FIG. 2 is a schematic flowchart of Embodiment 1 of a session management method according to the present disclosure. As shown in FIG. 2, the method in this embodiment may include the following operations.

Operation S201. A first SM entity receives first session context information from a second SM entity.

In this embodiment, the first SM entity receives the first session context information sent by the second SM entity. In one embodiment, the first session context information is historical session context information corresponding to a terminal. In one embodiment, the first session context information may be carried in a session context response, or may be carried in an SM relocation request. Certainly, the first session context information may alternatively be carried in other signaling between the first SM entity and the second SM entity. This is not limited in this embodiment.

In one embodiment, before operation S201, the method further includes: sending, by the first SM entity, a session context request to the second SM entity, where the session context request includes an identifier of the terminal. Correspondingly, the first SM entity receives a session context response sent by the second SM entity, where the session context response includes the first session context information. In one embodiment, the session context request may be an SM context request message, and the session context response may be an SM context response message. Certainly, the session context request and/or the session context response may alternatively be another message. This is not limited in this embodiment of this application.

In one embodiment, the first SM entity receives a first SM relocation request from the second SM entity, where the first SM relocation request includes the first session context information. In one embodiment, the first SM relocation request may be an SM relocation request message. Certainly, the first SM relocation request may alternatively be another message. This is not limited in this embodiment of this application.

Operation S202. The first SM entity generates second session context information based on the first session context information.

In this embodiment, after obtaining the first session context information, the first SM entity generates the second session context information based on the first session context information. In one embodiment, the second session context information is current session context information corresponding to the terminal.

Operation S203. The first SM entity sends the second session context information to a terminal.

In this embodiment, the first SM entity sends the second session context information to the terminal, so that the terminal communicates with a device on a network side based on the second session context information. In one embodiment, the second session context information may be carried in a message such as a session context update response or a session context update request and sent to the terminal. Certainly, the second session context information may alternatively be carried in another message. This is not limited in this embodiment of this application.

In this embodiment, the first SM entity receives the first session context information from the second SM entity, further, generates the second session context information based on the first session context information, and sends the second session context information to the terminal. As can be learned, a session in a tracking area update procedure of the terminal is updated in a scenario in which an MM entity and an SM entity are separated.

In one embodiment, before operation S201, the method further includes: receiving, by the first SM entity, a session context update request from the terminal, where the session context update request includes the identifier of the terminal and/or an identifier of the second SM entity. In one embodiment, the session context update request includes the identifier of the terminal, so that the first SM entity requests historical session context information (that is, the first session context information) of the terminal from the second SM entity based on the identifier of the terminal. In one embodiment, the session context update request may be a protocol data unit (PDU) session update request message. Certainly, the session context update request may alternatively be another message. This is not limited in this embodiment of this application.

In one embodiment, the first SM entity obtains the identifier of the second SM entity through parsing based on the identifier of the terminal, and then requests the historical session context information (that is, the first session context information) of the terminal from the second SM entity based on the identifier of the second SM entity. In one embodiment, the identifier of the second SM entity in this application may be address information of the second SM entity, or certainly, may be other identification information of the second SM entity. This is not limited in this embodiment.

In one embodiment, the session context update request further includes the identifier of the second SM entity. In one embodiment, the identifier of the second SM entity may be included in the identifier of the terminal, or the identifier of the second SM entity and the identifier of the terminal are separately included in the session context update request. Certainly, the session context request may include the identifier of the terminal and the identifier of the second SM entity in another form. This is not limited in this embodiment of this application. In one embodiment, the session context update request, the identifier of the terminal, and the identifier of the second SM entity may alternatively be carried in another manner. This is not limited in this embodiment of this application.

In one embodiment, before operation S201, the method further includes: receiving, by the first SM entity, a second SM relocation request from a target MM entity, where the second SM relocation request includes the identifier of the terminal, so that the first SM entity requests historical session context information (that is, the first session context information) of the terminal from the second SM entity based on the identifier of the terminal. In one embodiment, the first SM entity may alternatively obtain the identifier of the second SM entity through parsing based on the identifier of the terminal, and then requests the historical session context information of the terminal from the second SM entity. In one embodiment, the second SM relocation request may be an SM relocation request message. Certainly, the second SM relocation request may alternatively be another message. This is not limited in this embodiment of this application.

Figure 3:
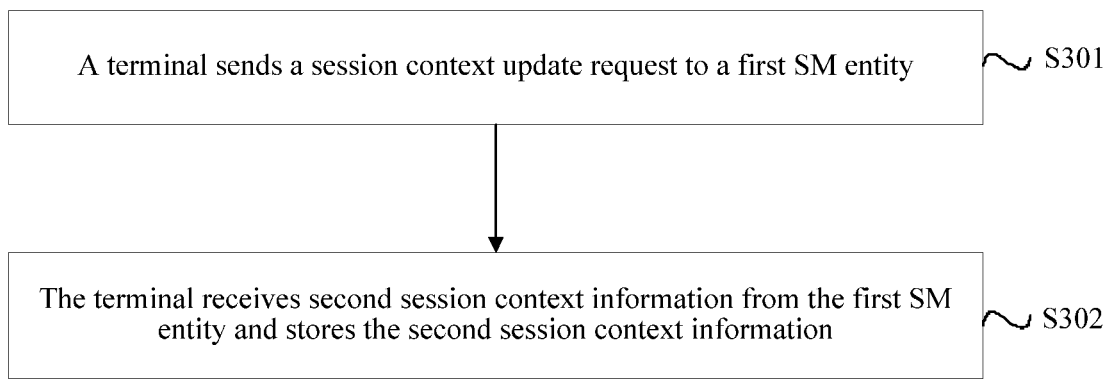
FIG. 3 is a schematic flowchart of Embodiment 2 of a session management method according to the present disclosure.

FIG. 3 is a schematic flowchart of Embodiment 2 of a session management method according to the present disclosure. Based on the foregoing embodiment, as shown in FIG. 3, the method in this embodiment may include the following operations.

Operation S301. A terminal sends a session context update request to a first SM entity.

In this embodiment, after triggering a tracking area update procedure, the terminal sends the session context update request to the first SM entity, where the session context update request includes an identifier of the terminal, so that the first SM entity requests historical session context information (that is, first session context information) of the terminal from a second SM entity based on the identifier of the terminal. In one embodiment, the first SM entity may obtain an identifier of the second SM entity through parsing based on the identifier of the terminal, to request the historical session context information of the terminal from the second SM entity based on the identifier of the second SM entity. In one embodiment, the session context update request may be a PDU session update request message. Certainly, the session context update request may alternatively be another message. This is not limited in this embodiment of this application.

In one embodiment, before operation S301, the method further includes:

obtaining, by the terminal, a tracking area identifier of a location of the terminal, where the tracking area identifier includes an identifier that is of a first SM entity and that corresponds to the current location; and determining, by the terminal based on the tracking area identifier, that the identifier of the first SM entity is not an identifier of the second SM entity previously connected to the terminal.

In this embodiment, before sending the session context update request to the first SM entity, the terminal determines, based on the currently detected tracking area identifier, whether the current location falls within a service range of the second SM entity previously connected to the terminal. In one embodiment, the terminal determines, based on the tracking area identifier, an identifier that is of an SM entity (for example, the identifier of the first SM entity) and that corresponds to the current location of the terminal. If the identifier that is of the SM entity and that corresponds to the current location of the terminal is not the identifier of the second SM entity previously connected to the terminal, the terminal triggers a session context update procedure (that is, sends the session context update request to the first SM entity). In one embodiment, the tracking area identifier=a mobile country code (MCC)+a mobile network code (MNC)+SM_ID+a tracking area code (TAC) (formula 1), where SM_ID is the identifier that is of the SM entity and that corresponds to the current location of the terminal. The terminal determines, based on the formula 1, the identifier that is of the SM entity and that corresponds to the current location of the terminal. Certainly, the terminal may alternatively determine, based on another variant formula of the formula 1 or in another manner, the identifier that is of the SM entity and that corresponds to the current location of the terminal. This is not limited in this embodiment.

In one embodiment, the identifier of the first SM entity in this application may be address information of the first SM entity, or certainly, may be other identification information of the first SM entity. This is not limited in this embodiment.

In one embodiment, before operation S301, the method further includes: receiving, by the terminal, an identifier of the first SM entity from an RAN device.

In this embodiment, before sending the session context update request to the first SM entity, the terminal receives the identifier of the first SM entity sent by the RAN device. In one embodiment, the first SM entity is a first SM entity selected by the RAN device based on preset policy information when the RAN device determines, based on the preset policy information and the identifier of the second SM entity, that an SM entity needs to be replaced for the terminal. In one embodiment, the identifier of the second SM entity is reported by the terminal to the RAN device by using a second Radio Resource Control (RRC) request message. Certainly, the terminal may alternatively add the identifier of the second SM entity to another message. This is not limited in this embodiment.

In one embodiment, before operation S301, the method further includes: receiving, by the terminal, an identifier of the first SM entity from a target MM entity.

In this embodiment, before sending the session context update request to the first SM entity, the terminal receives the identifier of the first SM entity sent by the target MM entity. In one embodiment, the first SM entity is a first SM entity selected by the target MM entity based on preset policy information when the target MM entity determines, based on the preset policy information, the identifier of the second SM entity, and location information of the terminal, that an SM entity needs to be replaced for the terminal. In one embodiment, the identifier of the second SM entity is reported by the terminal to the target MM entity, and the identifier of the second SM entity may be included in the identifier of the terminal, or may be independent of the identifier of the terminal and separately reported to the target MM entity.

Operation S302. The terminal receives second session context information from the first SM entity and stores the second session context information.

In this embodiment, the terminal receives the second session context information from the first SM entity and stores the second session context information. In one embodiment, the second session context information is new session context information generated by the first SM entity based on first session context information obtained from a second SM entity. In one embodiment, the second session context information may be carried in a session context update response or the like. Certainly, the second session context information may alternatively be carried in another message. This is not limited in this embodiment of this application.

In one embodiment, the session context update response may be a PDU session update response message. Certainly, the session context update response may alternatively be another message. This is not limited in this embodiment of this application.

In this embodiment, the terminal sends the session context update request to the first SM entity, receives the second session context information from the first SM entity, and stores the second session context information. As can be learned, a session in a tracking area update procedure of the terminal is updated in a scenario in which an MM entity and an SM entity are separated.

Figure 4:
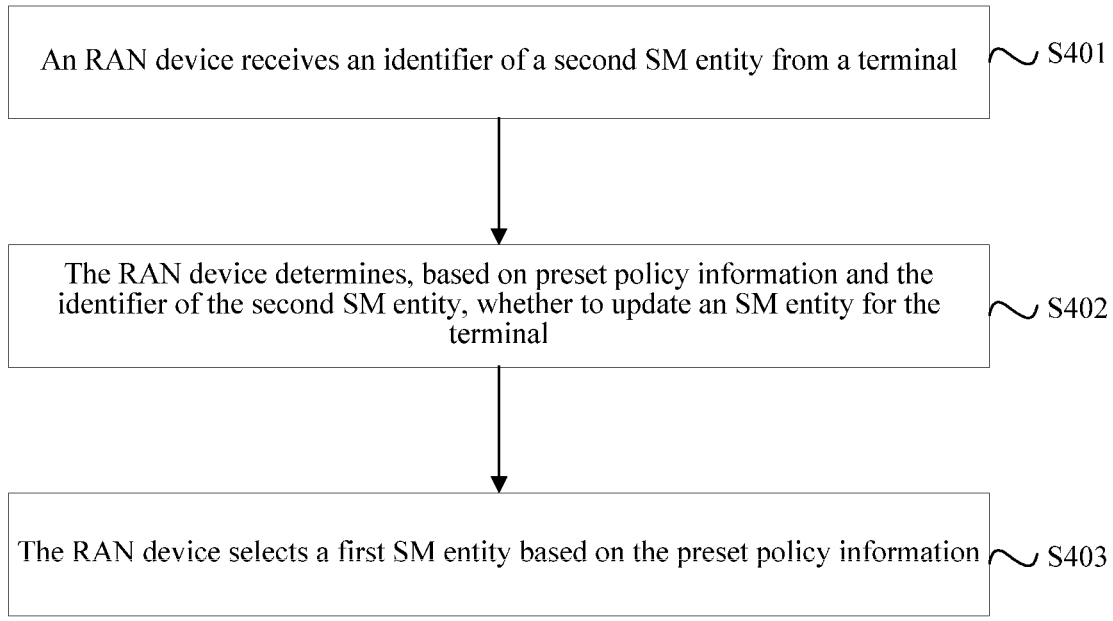
FIG. 4 is a schematic flowchart of Embodiment 3 of a session management method according to the present disclosure.

FIG. 4 is a schematic flowchart of Embodiment 3 of a session management method according to the present disclosure. Based on the foregoing embodiment, as shown in FIG. 4, the method in this embodiment may include the following operations.

Operation S401. An RAN device receives an identifier of a second SM entity from a terminal.

In this embodiment, the RAN device receives the identifier of the second SM entity sent by the terminal. In one embodiment, the identifier of the second SM entity may be carried in a first RRC request message or a second RRC request message, or certainly, may be carried in another message. This is not limited in this embodiment.

Operation S402. The RAN device determines, based on preset policy information and the identifier of the second SM entity, whether to update an SM entity for the terminal.

In this embodiment, the RAN device determines, based on the preset policy information and the identifier of the second SM entity, whether to replace an SM entity for the terminal. In one embodiment, if the preset policy information includes: if a current location of the terminal does not fall within a service range of the second SM entity, an SM entity needs to be replaced for the terminal, correspondingly, if the RAN device determines, based on the preset policy information and the identifier of the second SM entity, that the current location of the terminal does not fall within the service range of the second SM entity, an SM entity needs to be replaced for the terminal, and operation S403 is performed. In one embodiment, the preset policy information may alternatively include other policy information (for example, when the RAN device can learn of load information of each SM entity, if load of the second SM entity is excessively heavy, an SM entity needs to be replaced for the terminal). This is not limited in this embodiment.

Operation S403. The RAN device selects a first SM entity based on the preset policy information.

In this embodiment, when the RAN device determines that an SM entity needs to be replaced for the terminal, the RAN device selects the first SM entity based on the preset policy information. In one embodiment, the preset policy information further includes: selecting an SM entity closest to the terminal as the first SM entity. Certainly, the preset policy information may alternatively include other policy information (for example, selecting an SM entity with lightest load as a reselected first SM entity). This is not limited in this embodiment.

In this embodiment, the RAN device receives the identifier of the second SM entity from the terminal; further, determines, based on the preset policy information and the identifier of the second SM entity, whether to replace the SM entity for the terminal, and if yes, selects the first SM entity based on the preset policy information. As can be learned, a session in a tracking area update procedure of the terminal is updated in a scenario in which an MM entity and an SM entity are separated.

In one embodiment, operation S401 includes: receiving, by the RAN device, a first RRC request message from the terminal. In one embodiment, the first RRC request message includes a session context update request and the identifier of the second SM entity.

Correspondingly, after operation S403, the method further includes: sending, by the RAN device, a session context update request to the first SM entity.

In this embodiment, the RAN device receives the first RRC request message from the terminal. In one embodiment, the first RRC request message carries the session context update request of the terminal and the identifier of the second SM entity. Further, the RAN device determines, based on the preset policy information and the identifier of the second SM entity, whether to update the SM entity for the terminal, and if yes, the RAN device selects the first SM entity based on the preset policy information, and forwards the session context update request to the first SM entity.

In one embodiment, operation S401 includes: receiving, by the RAN device, a second RRC request message from the terminal. In one embodiment, the second RRC request message includes the identifier of the second SM entity and a tracking area update request.

Correspondingly, after operation S403, the method further includes: sending, by the RAN device, an identifier of the first SM entity to the terminal, so that the terminal sends a session context update request to the first SM entity based on the identifier of the first SM entity.

In this embodiment, the RAN device receives the second RRC request message from the terminal. In one embodiment, the second RRC request message carries the identifier of the second SM entity and the tracking area update request. Further, the RAN device determines, based on the preset policy information and the identifier of the second SM entity, whether to replace the SM entity for the terminal, and if yes, the RAN device selects the first SM entity based on the preset policy information, and sends the identifier of the first SM entity to the terminal, so that terminal sends the session context update request to the first SM entity based on the identifier of the first SM entity. In one embodiment, the identifier of the first SM entity may be carried in a second RRC response message. In one embodiment, the second RRC response message includes the identifier of the first SM entity and a tracking area update accept response. Certainly, the identifier of the first SM entity may alternatively be carried in another message. This is not limited in this embodiment. In one embodiment, the tracking area update (TAU) request may be a TAU request message, and the tracking area update accept response may be a TAU accept message. Certainly, the tracking area update request and/or the tracking area update accept response may alternatively be another message. This is not limited in this embodiment of this application.

Figure 5:
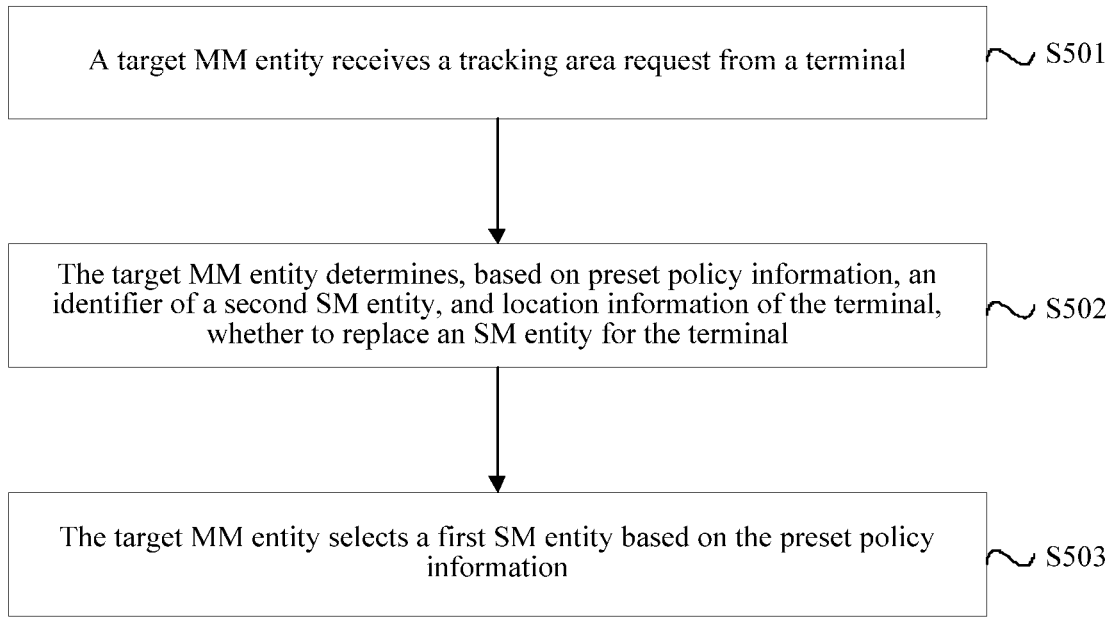
FIG. 5 is a schematic flowchart of Embodiment 4 of a session management method according to the present disclosure.

FIG. 5 is a schematic flowchart of Embodiment 4 of a session management method according to the present disclosure. Based on the foregoing embodiment, as shown in FIG. 5, the method in this embodiment may include the following operations.

Operation S501. A target MM entity receives a tracking area request from a terminal.

In this embodiment, the target MM entity receives the tracking area update request sent by the terminal. In one embodiment, the tracking area update request may be a TAU request message, or certainly, may be another message. This is not limited in this embodiment.

Operation S502. The target MM entity determines, based on preset policy information, an identifier of a second SM entity, and location information of the terminal, whether to replace an SM entity for the terminal.

In this embodiment, the target MM entity determines, based on the preset policy information, the identifier of the second SM entity, and the location information of the terminal, whether to replace an SM entity for the terminal. In one embodiment, if the preset policy information includes: if a current location of the terminal does not fall within a service range of the second SM entity, an SM entity needs to be replaced for the terminal, correspondingly, if the target MM entity determines, based on the preset policy information, the identifier of the second SM entity, and the location information of the terminal, that the current location of the terminal does not fall within the service range of the second SM entity, an SM entity needs to be replaced for the terminal, and operation S503 is performed. In one embodiment, the preset policy information may alternatively include other policy information (for example, when the target MM entity can learn of load information of each SM entity, if load of the second SM entity is excessively heavy, an SM entity needs to be replaced for the terminal). This is not limited in this embodiment.

In one embodiment, the identifier of the second SM entity may be obtained by the target MM entity through parsing based on an identifier of the terminal, or certainly, may be obtained in another manner. This is not limited in this embodiment.

Operation S503. The target MM entity selects a first SM entity based on the preset policy information.

In this embodiment, when the target MM entity determines that an SM entity needs to be replaced for the terminal, the target MM entity selects the first SM entity based on the preset policy information. In one embodiment, the preset policy information further includes: selecting an SM entity closest to the terminal as the first SM entity. Certainly, the preset policy information may alternatively include other policy information (for example, selecting an SM entity with lightest load as a reselected first SM entity). This is not limited in this embodiment.

In one embodiment, after operation S503, the method further includes: sending, by the target MM entity, an identifier of the first SM entity to the terminal, so that the terminal sends a session context update request to the first SM entity based on the identifier of the first SM entity. In one embodiment, the identifier of the first SM entity may be carried in a tracking area accept response, or certainly, may be carried in another message. This is not limited in this embodiment.

In one embodiment, after operation S503, the method further includes: sending, by the target MM entity, a second SM relocation request to the first SM entity, so that the first SM entity requests to obtain first session context information from the second SM entity, where the second SM relocation request includes an identifier of the terminal.

In this embodiment, after receiving the tracking area update request from the terminal, the target MM entity determines, based on the preset policy information, the identifier of the second SM entity, and the location information of the terminal, whether to replace the SM entity for the terminal, and if yes, selects the first SM entity based on the preset policy information. As can be learned, a session in a tracking area update procedure of the terminal is updated in a scenario in which an MM entity and an SM entity are separated.

Figure 6:
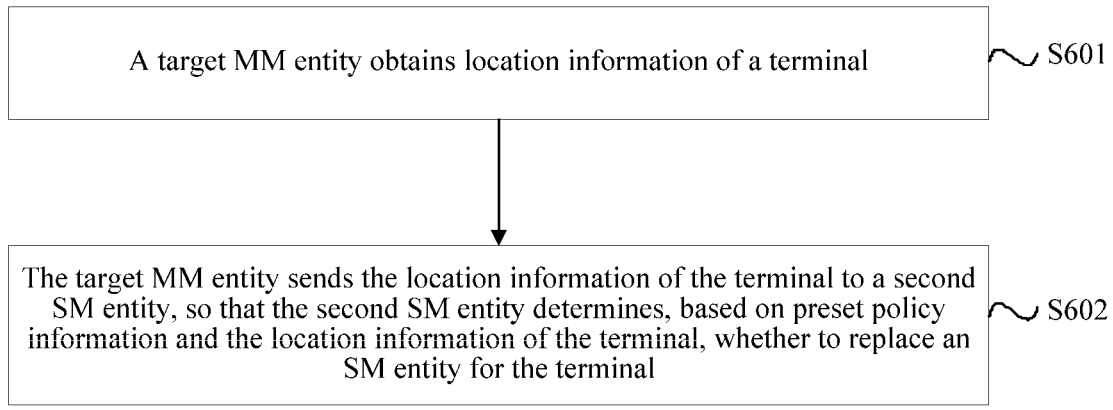
FIG. 6 is a schematic flowchart of Embodiment 5 of a session management method according to the present disclosure.

FIG. 6 is a schematic flowchart of Embodiment 5 of a session management method according to the present disclosure. Based on the foregoing embodiment, as shown in FIG. 6, the method in this embodiment may include the following operations.

Operation S601. A target MM entity obtains location information of a terminal.

Operation S602. The target MM entity sends the location information of the terminal to a second SM entity, so that the second SM entity determines, based on preset policy information and the location information of the terminal, whether to replace an SM entity for the terminal.

In this embodiment, the target MM entity may directly send the location information of the terminal to the second SM entity, or forwards the location information of the terminal to the second SM entity by using a source MM entity, so that the second SM entity determines, based on the preset policy information and the location information of the terminal, whether to replace an SM entity for the terminal.

In one embodiment, before operation S602, the method further includes: receiving, by the target MM entity, SM subscription information from a source MM entity.

In one embodiment, before sending the location information of the terminal to the second SM entity, the target MM entity receives the SM subscription information sent by the source MM entity. In one embodiment, the SM subscription information is: if the terminal triggers a tracking area update procedure, notifying the location information of the terminal to the second SM entity. In one embodiment, the SM subscription information is SM subscription information stored in the source MM entity when the second SM entity registers a service with the source MM entity. In one embodiment, the SM subscription information may be carried in a context response, or certainly, may be carried in another message. This is not limited in this embodiment.

In one embodiment, operation S602 includes: sending, by the target MM entity, the location information of the terminal to a source MM entity, so that the source MM entity forwards the location information of the terminal to the second SM entity. In one embodiment, the target MM entity sends the location information of the terminal to the source MM entity by using a context request, or certainly, may add the location information of the terminal to another message. This is not limited in this embodiment.

In this embodiment, the target MM entity obtains the location information of the terminal, and sends the location information of the terminal to the second SM entity, so that the second SM entity determines, based on the preset policy information and the location information of the terminal, whether to replace the SM entity for the terminal, to select an appropriate SM entity. As can be learned, a session in a tracking area update procedure of the terminal is updated in a scenario in which an MM entity and an SM entity are separated.

Figure 7:
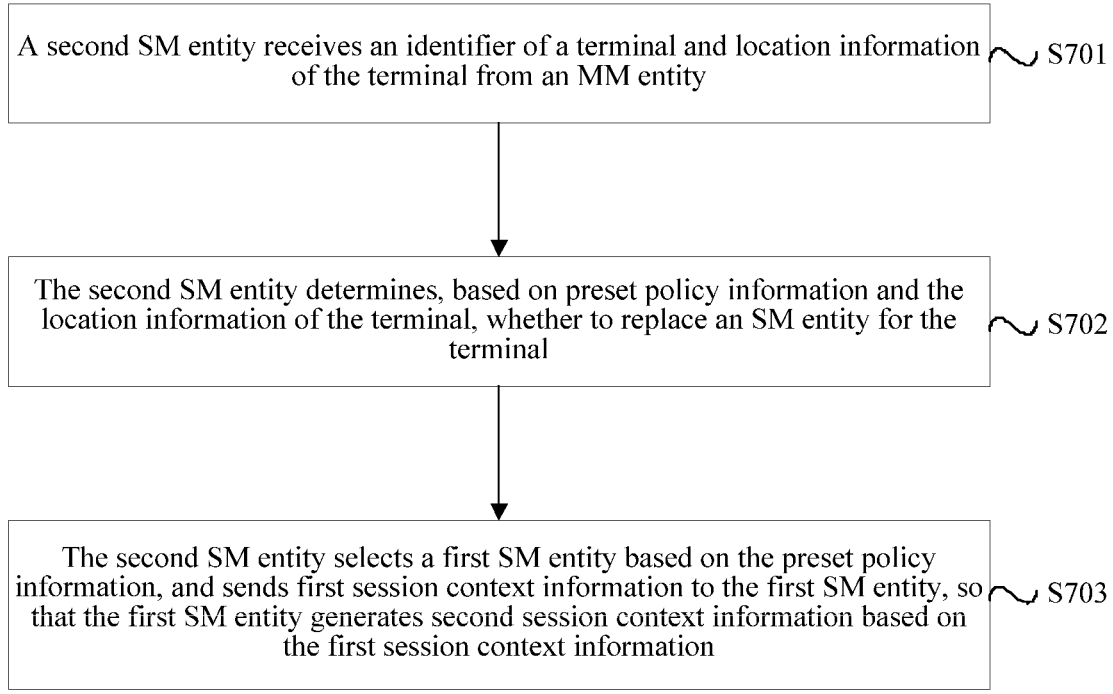
FIG. 7 is a schematic flowchart of Embodiment 6 of a session management method according to the present disclosure.

FIG. 7 is a schematic flowchart of Embodiment 6 of a session management method according to the present disclosure. Based on the foregoing embodiment, as shown in FIG. 7, the method in this embodiment may include the following operations.

Operation S701. A second SM entity receives an identifier of a terminal and location information of the terminal from an MM entity.

In this embodiment, the second SM entity receives the identifier of the terminal and the location information of the terminal from the MM entity. In one embodiment, the MM entity is a source MM entity or a target MM entity.

Operation S702. The second SM entity determines, based on preset policy information and the location information of the terminal, whether to replace an SM entity for the terminal.

In this embodiment, the second SM entity determines, based on the preset policy information and the location information of the terminal, whether to replace an SM entity for the terminal. In one embodiment, if the preset policy information includes: if a current location of the terminal does not fall within a service range of the second SM entity, an SM entity needs to be replaced for the terminal, correspondingly, if the second SM entity determines, based on the preset policy information and the location information of the terminal, that the current location of the terminal does not fall within the service range of the second SM entity, an SM entity needs to be replaced for the terminal, and operation 703 is performed. In one embodiment, the preset policy information may alternatively include other policy information (for example, when the second SM entity can learn of load information of each SM entity, if load of the second SM entity is excessively heavy, an SM entity needs to be replaced for the terminal). This is not limited in this embodiment.

Operation S703. The second SM entity selects a first SM entity based on the preset policy information, and sends first session context information to the first SM entity, so that the first SM entity generates second session context information based on the first session context information.

In one embodiment, the first session context information may be carried in a first SM relocation request, or certainly, may be carried in another message. This is not limited in this embodiment.

In this embodiment, the second SM entity receives the identifier of the terminal and the location information of the terminal from the MM entity; further, determines, based on the preset policy information and the location information of the terminal, whether to replace the SM entity for the terminal; and if yes, selects the first SM entity based on the preset policy information, and sends the first session context information to the first SM entity, so that the first SM entity generates the second session context information based on the first session context information. As can be learned, a session in a tracking area update procedure of the terminal is updated in a scenario in which an MM entity and an SM entity are separated.

Figure 8:
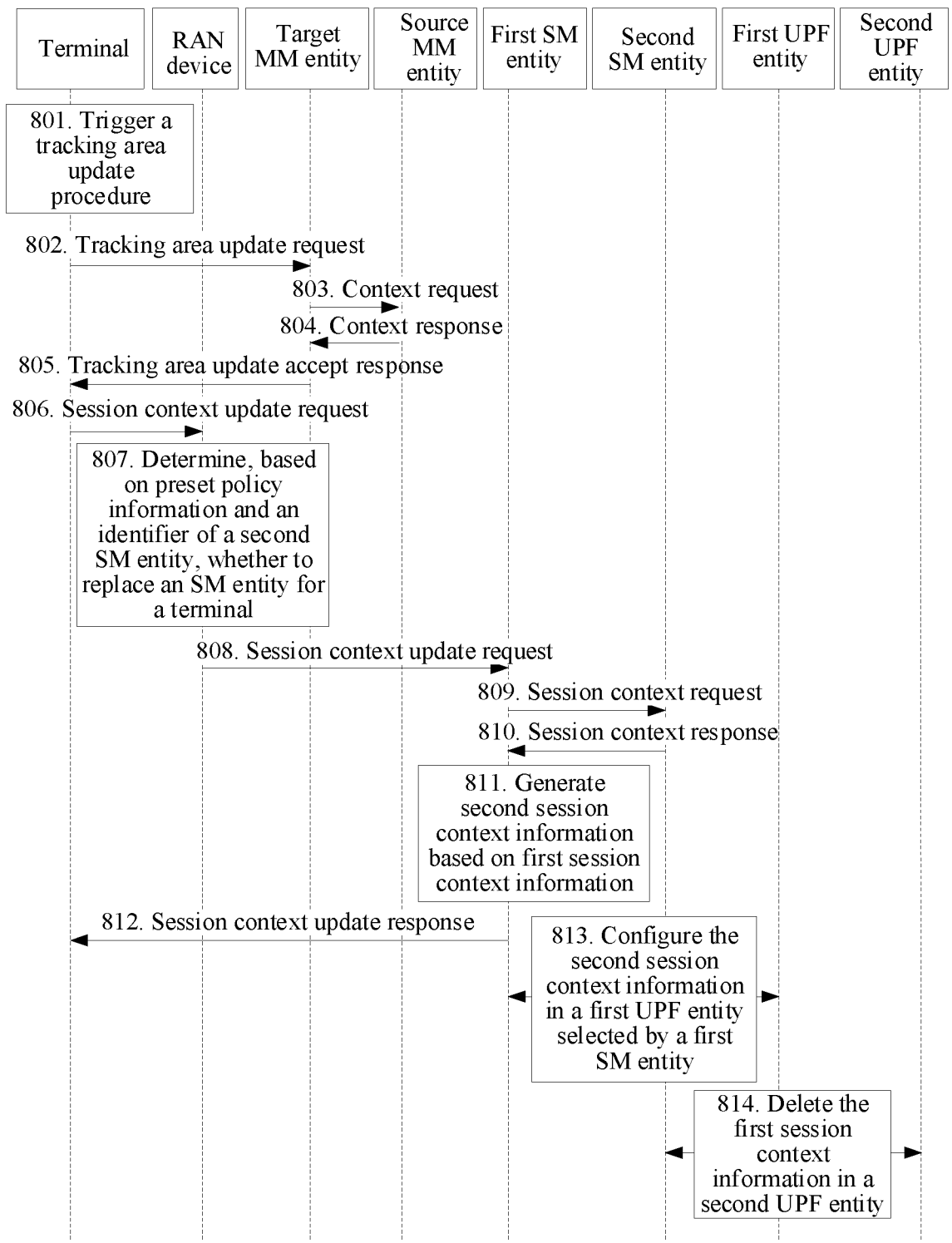
FIG. 8 is a schematic flowchart of Embodiment 7 of a session management method according to the present disclosure.

FIG. 8 is a schematic flowchart of Embodiment 7 of a session management method according to the present disclosure. Based on the foregoing embodiment, as shown in FIG. 8, the method in this embodiment may include the following operations.

Operation 801. A terminal triggers a tracking area update procedure.

Operation 802. The terminal sends a tracking area update request to a target MM entity.

Operation 803. The target MM entity sends a context request to a source MM entity. In one embodiment, the context request may be a context request message, or certainly, may be another message. This is not limited in this embodiment.

Operation 804. The source MM entity returns a context response to the target MM entity. In one embodiment, the context response includes MM context information. In one embodiment, the context response may be a context response message, or certainly, may be another message. This is not limited in this embodiment.

Operation 805. The target MM entity returns a tracking area update accept response to the terminal.

Operation 806. The terminal sends a session context update request.

In one embodiment, the session context update request may be carried in a first RRC request message. In one embodiment, the session context update request includes an identifier of the terminal. In one embodiment, the session context update request may alternatively include an identifier of a second SM entity. Alternatively, in one embodiment, the first RRC request message may carry the session context update request and the identifier of the terminal (In one embodiment, the identifier of the terminal may include the identifier of the second SM entity). Alternatively, in one embodiment, the first RRC request message may carry only the identifier of the second SM entity. Alternatively, in one embodiment, the first RRC request message may carry only the session context update request, the identifier of the terminal, and the identifier of the second SM entity.

Operation 807. An RAN device determines, based on preset policy information and an identifier of a second SM entity, whether to replace an SM entity for the terminal.

In one embodiment, the RAN device determines, based on the preset policy information and the identifier of the second SM entity, whether to replace an SM entity for the terminal, and if yes, selects a first SM entity based on the preset policy information, and performs operation 808. In one embodiment, another network function entity, such as a slice selection function (SSF) entity, may also participate in "determining, based on the preset policy information and the identifier of the second SM entity, whether to replace an SM entity for the terminal".

Operation 808. The RAN device sends the session context update request to a first SM entity.

Operation 809. The first SM entity sends a session context request to the second SM entity.

In one embodiment, the first SM entity obtains the identifier of the second SM entity through parsing based on the identifier of the terminal included in the session context update request.

In one embodiment, the session context update request further includes the identifier of the second SM entity. In one embodiment, the identifier of the second SM entity and the identifier of the terminal may be separately included in the session context update request. Correspondingly, the first SM entity directly determines the identifier of the second SM entity based on the session context update request, and then sends the session context request to the second SM entity based on the identifier of the second SM entity.

Operation 810. The second SM entity returns a session context response to the first SM entity. In one embodiment, the session context response includes first session context information.

Operation 811. The first SM entity generates second session context information based on the first session context information. In one embodiment, the first SM entity further allocates a new IP address.

Operation 812. The first SM entity sends a session context update response to the terminal. In one embodiment, the session context update response includes the second session context information.

Operation 813. The first SM entity configures the second session context information in a first UPF entity selected by the first SM entity. In one embodiment, the first UPF entity is a current user plane function node.

Operation 814. The second SM entity deletes the first session context information in a second UPF entity. In one embodiment, the second UPF entity is a historical user plane function node.

In one embodiment, in operation 807, when the RAN device determines, based on the preset policy information and the identifier of the second SM entity, that no SM entity needs to be replaced for the terminal, the first SM entity and the second SM entity are the same SM entity, and operation 809 and operation 810 are deleted.

In one embodiment, in operation 807, when the RAN device determines, based on the preset policy information and the identifier of the second SM entity, that no SM entity needs to be replaced for the terminal but a UPF needs to be replaced for the terminal, the first SM entity and the second SM entity are the same SM entity, and operation 809 and operation 810 are deleted, but other operations still need to be performed.

In one embodiment, in this embodiment, magnitude of operation numbers does not limit an execution sequence, and the execution sequence of the operations may be appropriately adjusted. This is not limited in this embodiment of this application.

As can be learned, a terminal location and a session in a tracking area update procedure of the terminal are updated in a scenario in which an MM entity and an SM entity are separated.

Figure 9:
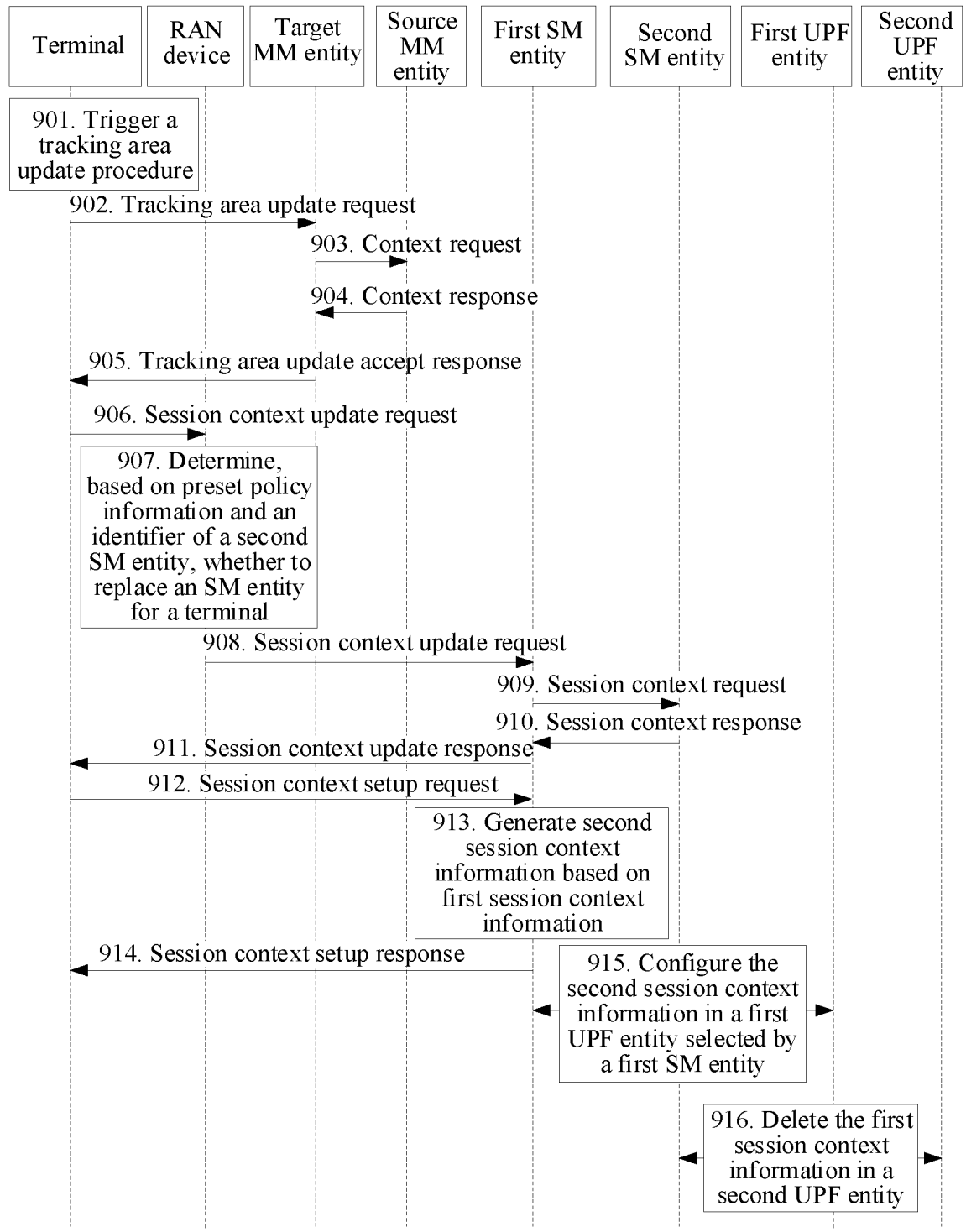
FIG. 9 is a schematic flowchart of Embodiment 8 of a session management method according to the present disclosure.

FIG. 9 is a schematic flowchart of Embodiment 8 of a session management method according to the present disclosure. Based on the foregoing embodiment, as shown in FIG. 9, the method in this embodiment may include the following operations.

Operation 901. A terminal triggers a tracking area update procedure.

Operation 902. The terminal sends a tracking area update request to a target MM entity.

Operation 903. The target MM entity sends a context request to a source MM entity.

Operation 904. The source MM entity returns a context response to the target MM entity. In one embodiment, the context response includes MM context information.

Operation 905. The target MM entity returns a tracking area update accept response to the terminal.

Operation 906. The terminal sends a session context update request.

In one embodiment, the session context update request may be carried in a first RRC request message. In one embodiment, the session context update request includes an identifier of the terminal. In one embodiment, the session context update request may alternatively include an identifier of a second SM entity. Alternatively, in one embodiment, the first RRC request message may carry the session context update request and the identifier of the terminal (in one embodiment, the identifier of the terminal may include the identifier of the second SM entity). Alternatively, in one embodiment, the first RRC request message may carry only the identifier of the second SM entity. Alternatively, in one embodiment, the first RRC request message may carry only the session context update request, the identifier of the terminal, and the identifier of the second SM entity.

Operation 907. An RAN device determines, based on preset policy information and an identifier of a second SM entity, whether to replace an SM entity for the terminal.

In one embodiment, the RAN device determines, based on the preset policy information and the identifier of the second SM entity, whether to replace an SM entity for the terminal, and if yes, selects a first SM entity based on the preset policy information, and performs operation 908. In one embodiment, another network function entity, such as a slice selection function (SSF) entity, may also participate in "determining, based on the preset policy information and the identifier of the second SM entity, whether to replace an SM entity for the terminal".

Operation 908. The RAN device sends the session context update request to a first SM entity.

Operation 909. The first SM entity sends a session context request to the second SM entity.

In one embodiment, the first SM entity obtains the identifier of the second SM entity through parsing based on the identifier of the terminal included in the session context update request.

In one embodiment, the session context update request further includes the identifier of the second SM entity. In one embodiment, the identifier of the second SM entity and the identifier of the terminal may be separately included in the session context update request. Correspondingly, the first SM entity directly determines the identifier of the second SM entity based on the session context update request, and then sends the session context request to the second SM entity based on the identifier of the second SM entity.

Operation 910. The second SM entity returns a session context response to the first SM entity. In one embodiment, the session context response includes first session context information.

Operation 911. The first SM entity sends a session context update response to the terminal. In one embodiment, the session context update response includes a session context re-setup indication.

Operation 912. The terminal sends a session context setup request to the first SM entity. In one embodiment, the session context setup request may be a PDU session setup request. Certainly, the session context setup request may alternatively be another message. This is not limited in this embodiment.

Operation 913. The first SM entity generates second session context information based on the first session context information. In one embodiment, the first SM entity further allocates a new IP address.

Operation 914. The first SM entity sends a session context setup response to the terminal. In one embodiment, the session context setup response includes the second session context information. In one embodiment, the session context setup response may be a PDU session setup response. Certainly, the session context setup response may alternatively be another message. This is not limited in this embodiment.

Operation 915. The first SM entity configures the second session context information in a first UPF entity selected by the first SM entity.

Operation 916. The second SM entity deletes the first session context information in a second UPF entity.

In one embodiment, in operation 907, when the RAN device determines, based on the preset policy information and the identifier of the second SM entity, that no SM entity needs to be replaced for the terminal, the first SM entity and the second SM entity are the same SM entity, and operation 909 and operation 910 are deleted.

In one embodiment, in operation 907, when the RAN device determines, based on the preset policy information and the identifier of the second SM entity, that no SM entity needs to be replaced for the terminal but a UPF needs to be replaced for the terminal, the first SM entity and the second SM entity are the same SM entity, and operation 909 and operation 910 are deleted, but other operations still need to be performed.

In conclusion, a difference between this embodiment and the embodiment shown in FIG. 8 is as follows: The first SM entity instructs the terminal to send the session context re-setup indication, so that the terminal sends the session context setup request to the first SM entity, and then the first SM entity sends regenerated second session context information to the terminal by using the session context setup response. In other words, operation 911, operation 912, and operation 914 in the embodiment of FIG. 9 replace operation 814 (that is, the first SM entity sends the second session context information to the terminal by using the session context response) in the embodiment of FIG. 8. In one embodiment, similar replacement may be performed for any embodiment of FIG. 10 to FIG. 15 in this application, and details are not described again below.

In one embodiment, in this embodiment, magnitude of operation numbers does not limit an execution sequence, and the execution sequence of the operations may be appropriately adjusted. This is not limited in this embodiment of this application.

As can be learned, a terminal location and a session in a tracking area update procedure of the terminal are updated in a scenario in which an MM entity and an SM entity are separated.

Figure 10:
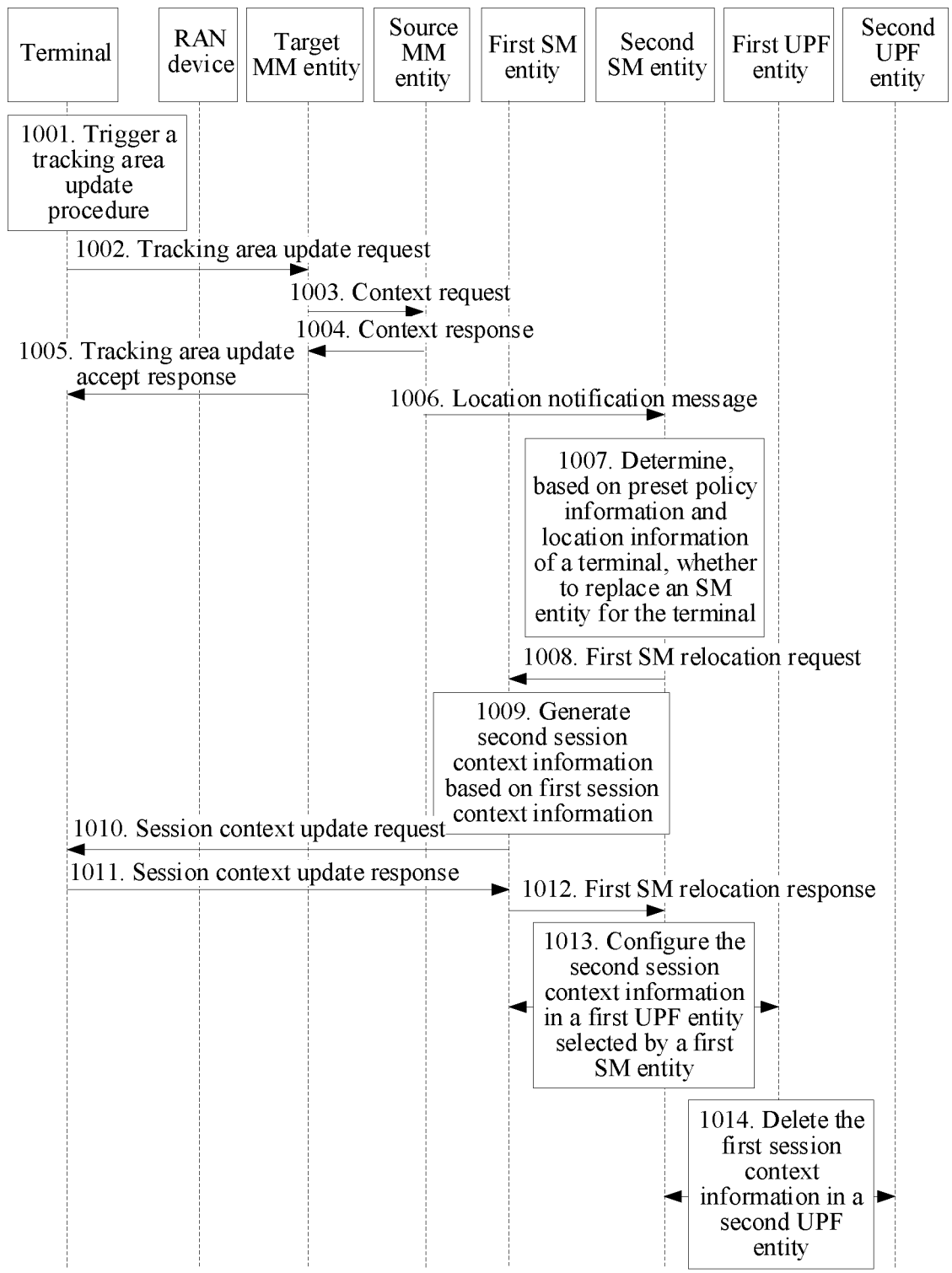
FIG. 10 is a schematic flowchart of Embodiment 9 of a session management method according to the present disclosure.

FIG. 10 is a schematic flowchart of Embodiment 9 of a session management method according to the present disclosure. Based on the foregoing embodiment, as shown in FIG. 10, the method in this embodiment may include the following operations.

Operation 1001. A terminal triggers a tracking area update procedure.

Operation 1002. The terminal sends a tracking area update request to a target MM entity.

In one embodiment, the tracking area update request includes an identifier of the terminal. In one embodiment, the tracking area update request may alternatively include an identifier of a second SM entity.

Operation 1003. The target MM entity sends a context request to a source MM entity. In one embodiment, the context request includes an identifier of the terminal and location information of the terminal. In one embodiment, the context request further includes an identifier of a second SM entity.

Operation 1004. The source MM entity returns a context response to the target MM entity. In one embodiment, the context response includes MM context information.

Operation 1005. The target MM entity returns a tracking area update accept response to the terminal.

Operation 1006. The source MM entity sends a location notification message to the second SM entity, to notify the second SM entity that the location information of the terminal changes. In one embodiment, the location notification message includes the identifier of the terminal and the location information of the terminal. In one embodiment, the source MM entity obtains the identifier of the second SM entity through parsing based on the identifier of the terminal included in the context request. Alternatively, in one embodiment, the source MM entity obtains the identifier of the second SM entity based on the context request carrying the identifier of the second SM entity. Alternatively, in one embodiment, the source MM entity searches for SM subscription information of the terminal based on the identifier of the terminal included in the context request, to obtain the identifier of the second SM entity. Certainly, the source MM entity may alternatively obtain the identifier of the second SM entity in another manner. This is not limited in this embodiment.

Operation 1007. The second SM entity determines, based on preset policy information and the location information of the terminal, whether to replace an SM entity for the terminal, and if yes, selects a first SM entity based on the preset policy information, and performs operation 1008.

Operation 1008. The second SM entity sends a first SM relocation request to the first SM entity. In one embodiment, the first SM relocation request includes first session context information.

Operation 1009. The first SM entity generates second session context information based on the first session context information. In one embodiment, the first SM entity further allocates a new IP address.

Operation 1010. The first SM entity sends a session context update request to the terminal. In one embodiment, the session context update request includes the second session context information.

Operation 1011. The terminal returns a session context update response to the first SM entity.

Operation 1012. The first SM entity returns a first SM relocation response to the second SM entity. In one embodiment, the first SM relocation response may be an SM relocation response message. Certainly, the first session management SM relocation response may alternatively be another message. This is not limited in this embodiment.

Operation 1013. The first SM entity configures the second session context information in a first UPF entity selected by the first SM entity.

Operation 1014. The second SM entity deletes the first session context information in a second UPF entity.

In one embodiment, after operation 1006, or after operation 1012, the second SM entity may alternatively return a location notification acknowledgment message to the source MM entity. In one embodiment, the tracking area update accept response in operation 1005 in the foregoing procedure may be returned by the target MM entity to the terminal after the second SM entity returns the location notification acknowledgment message to the source MM entity.

In one embodiment, in operation 1007, when the second SM entity determines, based on the preset policy information and the identifier of the second SM entity, that no SM entity needs to be replaced for the terminal, the first SM entity and the second SM entity are the same SM entity, and operation 1008 and operation 1012 are deleted.

In one embodiment, in operation 107, when the second SM entity determines, based on the preset policy information and the location information of the terminal, that no SM entity needs to be replaced for the terminal but a UPF needs to be replaced for the terminal, the first SM entity and the second SM entity are the same SM entity, and operation 1008 and operation 1012 are deleted, but other operations still need to be performed.

In one embodiment, in this embodiment, magnitude of operation numbers does not limit an execution sequence, and the execution sequence of the operations may be appropriately adjusted. This is not limited in this embodiment of this application. As can be learned, a terminal location and a session in a tracking area update procedure of the terminal are updated in a scenario in which an MM entity and an SM entity are separated.

Figure 11:
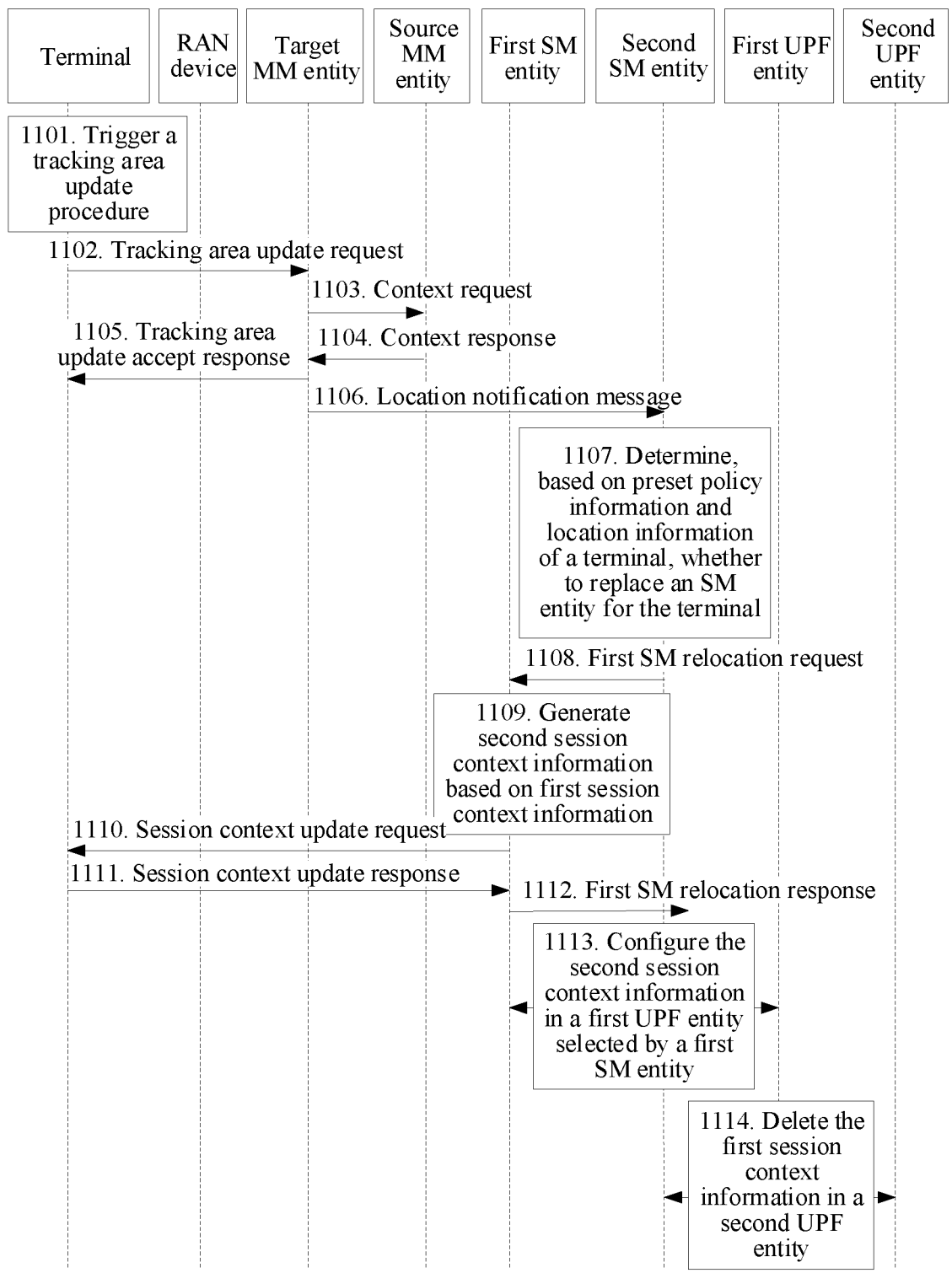
FIG. 11 is a schematic flowchart of Embodiment 10 of a session management method according to the present disclosure.

FIG. 11 is a schematic flowchart of Embodiment 10 of a session management method according to the present disclosure. Based on the foregoing embodiment, as shown in FIG. 11, the method in this embodiment may include the following operations.

Operation 1101. A terminal triggers a tracking area update procedure.

Operation 1102. The terminal sends a tracking area update request to a target MM entity.

In one embodiment, the tracking area update request includes an identifier of the terminal. In one embodiment, the tracking area update request may alternatively include an identifier of a second SM entity.

Operation 1103. The target MM entity sends a context request to a source MM entity. In one embodiment, the context request includes an identifier of the terminal.

Operation 1104. The source MM entity returns a context response to the target MM entity. In one embodiment, the context response includes MM context information and SM subscription information (in one embodiment, the SM subscription information is to notify location information of the terminal to a second SM entity if the terminal triggers the tracking area update procedure).

Operation 1105. The target MM entity returns a tracking area update accept response to the terminal.

Operation 1106. The target MM entity sends a location notification message to the second SM entity, to notify the second SM entity that the location information of the terminal changes. In one embodiment, the location notification message includes the identifier of the terminal and the location information of the terminal.

In one embodiment, the target MM entity obtains the identifier of the second SM entity through parsing based on the identifier of the terminal included in the tracking area update request. Alternatively, in one embodiment, the target MM entity obtains the identifier of the second SM entity based on the tracking area update request carrying the identifier of the second SM entity. Alternatively, in one embodiment, the target MM entity searches for the SM subscription information of the terminal based on the identifier of the terminal included in the tracking area update request, to obtain the identifier of the second SM entity. Certainly, the target MM entity may alternatively obtain the identifier of the second SM entity in another manner. This is not limited in this embodiment.

Operation 1107. The second SM entity determines, based on preset policy information and the location information of the terminal, whether to replace an SM entity for the terminal, and if yes, selects a first SM entity based on the preset policy information, and performs operation 1108.

Operation 1108. The second SM entity sends a first SM relocation request to the first SM entity. In one embodiment, the first SM relocation request includes first session context information.

Operation 1109. The first SM entity generates second session context information based on the first session context information. In one embodiment, the first SM entity further allocates a new IP address.

Operation 1110. The first SM entity sends a session context update request to the terminal. In one embodiment, the session context update request includes the second session context information.

Operation 1111. The terminal returns a session context update response to the first SM entity.

Operation 1112. The first SM entity returns a first SM relocation response to the second SM entity.

Operation 1113. The first SM entity configures the second session context information in a first UPF entity selected by the first SM entity.

Operation 1114. The second SM entity deletes the first session context information in a second UPF entity.

In one embodiment, after operation 1106, or after operation 1112, the second SM entity may alternatively return a location notification acknowledgment message to the source MM entity. In one embodiment, the tracking area update accept response in operation 1105 in the foregoing procedure may be returned by the target MM entity to the terminal after the second SM entity returns the location notification acknowledgment message to the source MM entity.

In one embodiment, in operation 1107, when the second SM entity determines, based on the preset policy information and the location information of the terminal, that no SM entity needs to be replaced for the terminal, the first SM entity and the second SM entity are the same SM entity, and operation 1108 and operation 1112 are deleted.

In one embodiment, in operation 1107, when the second SM entity determines, based on the preset policy information and the location information of the terminal, that no SM entity needs to be replaced for the terminal but a UPF needs to be replaced for the terminal, the first SM entity and the second SM entity are the same SM entity, and operation 1108 and operation 1112 are deleted, but other operations still need to be performed.

In one embodiment, in this embodiment, magnitude of operation numbers does not limit an execution sequence, and the execution sequence of the operations may be appropriately adjusted. This is not limited in this embodiment of this application.

As can be learned, a terminal location and a session in a tracking area update procedure of the terminal are updated in a scenario in which an MM entity and an SM entity are separated.

Figure 12:
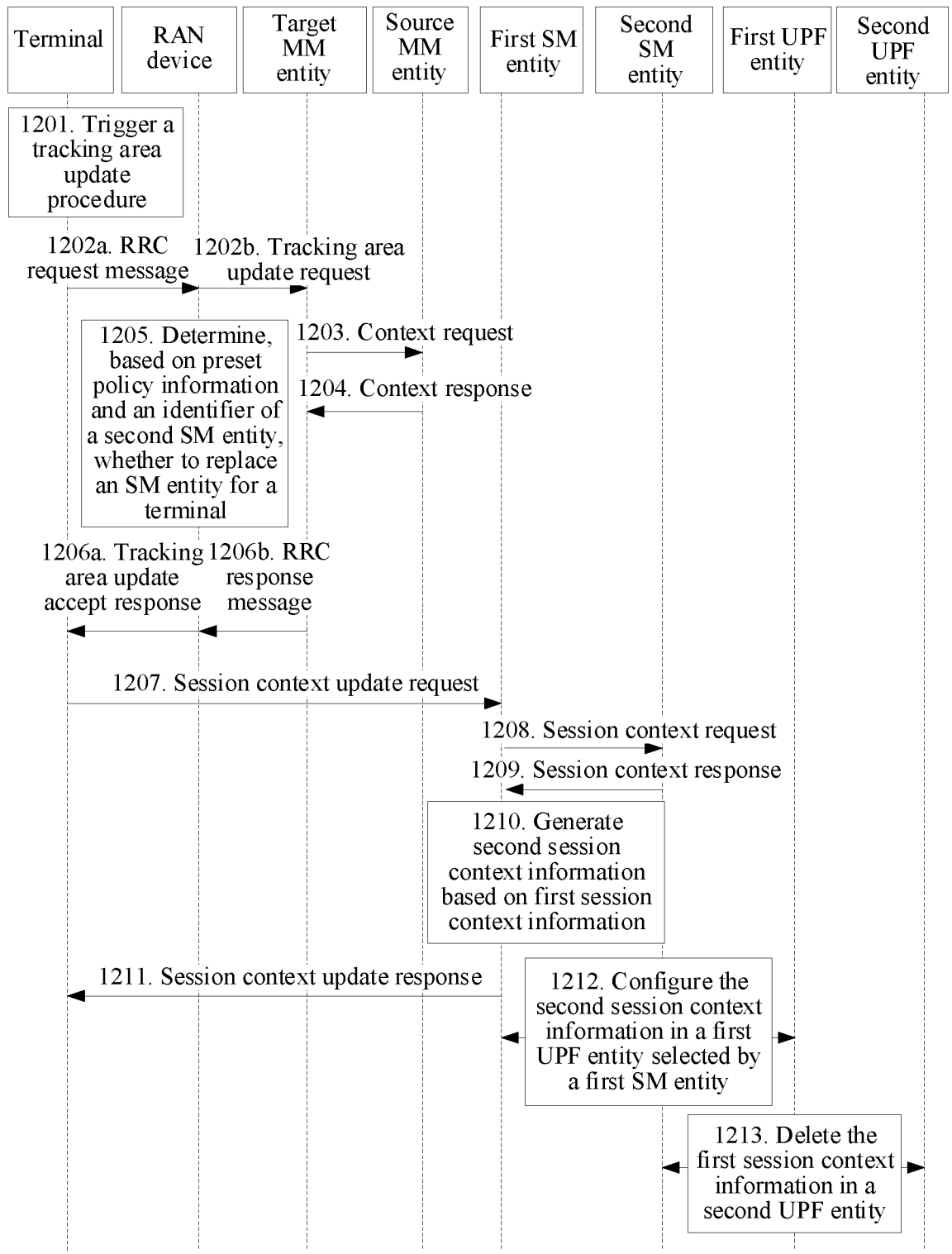
FIG. 12 is a schematic flowchart of Embodiment 11 of a session management method according to the present disclosure.

FIG. 12 is a schematic flowchart of Embodiment 11 of a session management method according to the present disclosure. Based on the foregoing embodiment, as shown in FIG. 12, the method in this embodiment may include the following operations.

Operation 1201. A terminal triggers a tracking area update procedure.

Operation 1202a. The terminal sends a second RRC request message to an RAN device. In one embodiment, the second RRC request message includes a tracking area update request and an identifier of a second SM entity. In one embodiment, the second RRC request message may include a tracking area update request and an identifier of the terminal (in one embodiment, the identifier of the terminal may include an identifier of a second SM entity). In one embodiment, the second RRC request message may alternatively carry only an identifier of a second SM entity. Certainly, the identifier of the second SM entity may be carried in another manner. This is not limited in this embodiment.

Operation 1202b. The RAN device sends the tracking area update request to a target MM entity.

Operation 1203. The target MM entity sends a context request to a source MM entity.

Operation 1204. The source MM entity returns a context response to the target MM entity. In one embodiment, the context response includes MM context information.

Operation 1205. The RAN device determines, based on preset policy information and the identifier of the second SM entity, whether to replace an SM entity for the terminal.

In one embodiment, the RAN device determines, based on the preset policy information and the identifier of the second SM entity, whether to replace an SM entity for the terminal, and if yes, selects a first SM entity based on the preset policy information, and performs operation 1206b. In one embodiment, another network function entity, such as a slice selection function (SSF) entity, may also participate in "determining, based on the preset policy information and the identifier of the second SM entity, whether to replace an SM entity for the terminal".

Operation 1206a. The target MM entity returns a tracking area update accept response to the terminal.

Operation 1206b. The RAN device returns a second RRC response message to the terminal. In one embodiment, the second RRC response message includes the tracking area update accept response and an identifier of a first SM entity.

Operation 1207. The terminal sends a session context update request.

In one embodiment, the session context update request may be carried in a third RRC request message. In one embodiment, the session context update request carries the identifier of the terminal. In one embodiment, the session context update request may alternatively carry the identifier of the second SM entity. Alternatively, in one embodiment, the third RRC request message may carry the identifier of the first SM entity, so that the RAN device sends the session context update request to the first SM entity based on the identifier of the first SM entity.

Operation 1208. The first SM entity sends a session context request to the second SM entity.

In one embodiment, the first SM entity obtains the identifier of the second SM entity through parsing based on the identifier of the terminal included in the session context update request. Alternatively, in one embodiment, the first SM entity obtains the identifier of the second SM entity based on the session context update request carrying the identifier of the second SM entity. Certainly, the first SM entity may alternatively obtain the identifier of the second SM entity in another manner. This is not limited in this embodiment.

Operation 1209. The second SM entity returns a session context response to the first SM entity. In one embodiment, the session context response includes first session context information.

Operation 1210. The first SM entity generates second session context information based on the first session context information. In one embodiment, the first SM entity further allocates a new IP address.

Operation 1211. The first SM entity sends a session context update response to the terminal. In one embodiment, the session context update response includes the second session context information.

Operation 1212. The first SM entity configures the second session context information in a first UPF entity selected by the first SM entity.

Operation 1213. The second SM entity deletes the first session context information in a second UPF entity.

In one embodiment, in operation 1102a, the identifier of the second SM entity may alternatively be carried in another RRC request message, and correspondingly, in operation 1106b, the identifier of the first SM entity may alternatively be carried in another RRC response message.

In one embodiment, in operation 1105, when the RAN device determines, based on the preset policy information and the identifier of the second SM entity, that no SM entity needs to be replaced for the terminal, if the RAN device may further determine whether a user plane function needs to be reselected for the terminal, and if yes, the RAN device may instruct the terminal to initiate a session context update procedure by using an RRC response message.

In one embodiment, in this embodiment, magnitude of operation numbers does not limit an execution sequence, and the execution sequence of the operations may be appropriately adjusted. This is not limited in this embodiment of this application.

As can be learned, a terminal location and a session in a tracking area update procedure of the terminal are updated in a scenario in which an MM entity and an SM entity are separated.

Figure 13:
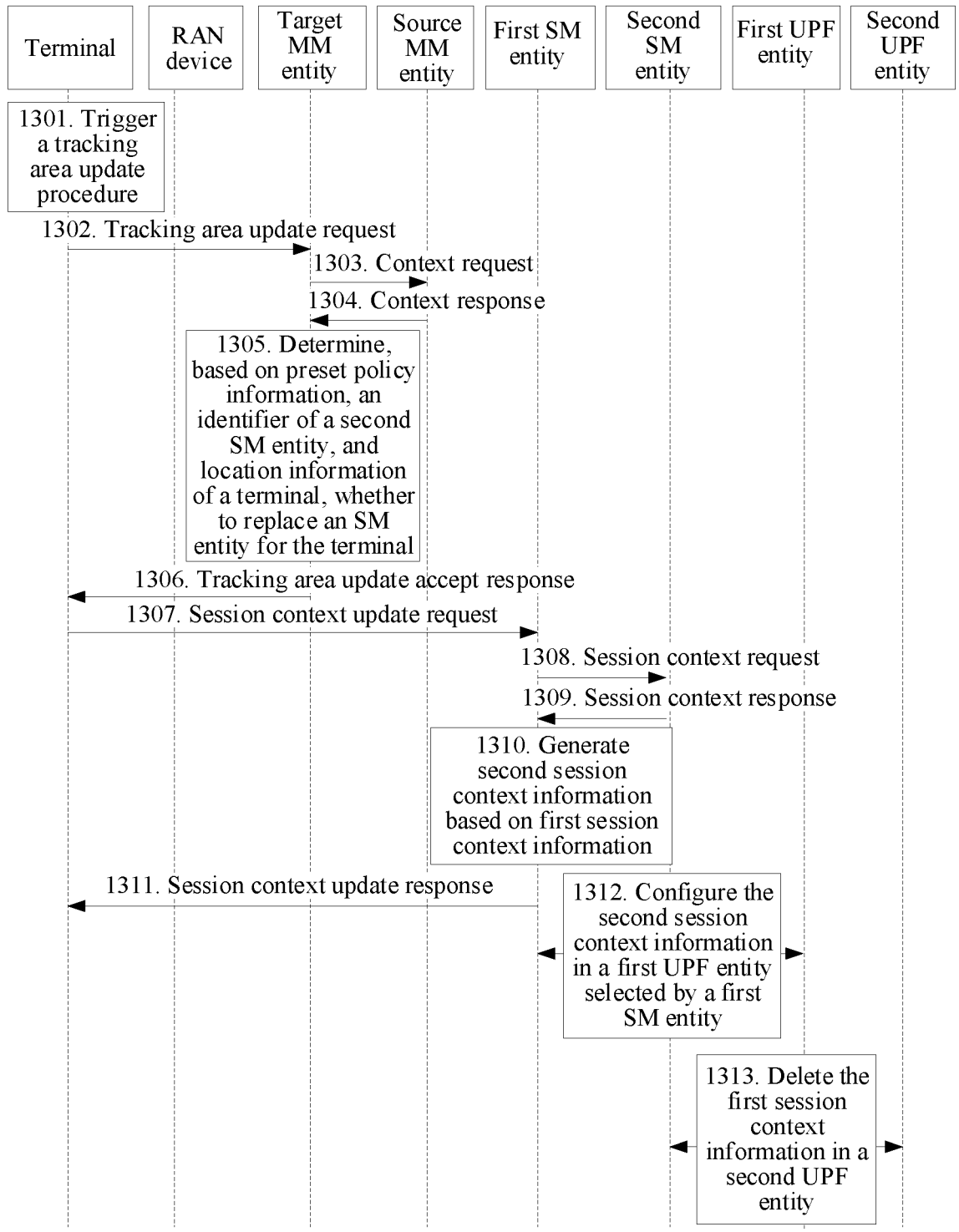
FIG. 13 is a schematic flowchart of Embodiment 12 of a session management method according to the present disclosure.

FIG. 13 is a schematic flowchart of Embodiment 12 of a session management method according to the present disclosure. Based on the foregoing embodiment, as shown in FIG. 13, the method in this embodiment may include the following operations.

Operation 1301. A terminal triggers a tracking area update procedure.

Operation 1302. The terminal sends a tracking area update request to a target MM entity.

Operation 1303. The target MM entity sends a context request to a source MM entity.

Operation 1304. The source MM entity returns a context response to the target MM entity. In one embodiment, the context response includes MM context information.

Operation 1305. The target MM entity determines, based on preset policy information, an identifier of a second SM entity, and location information of the terminal, whether to replace an SM entity for the terminal, and if yes, selects a first SM entity based on the preset policy information, and performs operation 1306.

Operation 1306. The target MM entity returns a tracking area update accept response to the terminal. In one embodiment, the tracking area update accept response includes an identifier of the first SM entity.

Operation 1307. The terminal sends a session context update request.

In one embodiment, the session context update request may be carried in a third RRC request message. In one embodiment, the session context update request carries an identifier of the terminal. In one embodiment, the session context update request may alternatively carry the identifier of the second SM entity. Alternatively, in one embodiment, the third RRC request message may carry the identifier of the first SM entity, so that an RAN device sends the session context update request to the first SM entity based on the identifier of the first SM entity.

Operation 1308. The first SM entity sends a session context request to the second SM entity.

In one embodiment, the first SM entity obtains the identifier of the second SM entity through parsing based on the identifier of the terminal included in the session context update request. Alternatively, in one embodiment, the first SM entity obtains the identifier of the second SM entity based on the session context update request carrying the identifier of the second SM entity. Certainly, the first SM entity may alternatively obtain the identifier of the second SM entity in another manner. This is not limited in this embodiment.

Operation 1309. The second SM entity returns a session context response to the first SM entity. In one embodiment, the session context response includes first session context information.

Operation 1310. The first SM entity generates second session context information based on the first session context information. In one embodiment, the first SM entity further allocates a new IP address.

Operation 1311. The first SM entity sends a session context update response to the terminal. In one embodiment, the session context update response includes the second session context information.

Operation 1312. The first SM entity configures the second session context information in a first UPF entity selected by the first SM entity.

Operation 1313. The second SM entity deletes the first session context information in a second UPF entity.

In one embodiment, in operation 1305, when the target MM entity determines, based on the preset policy information, the identifier of the second SM entity, and the location information of the terminal, that no SM entity needs to be replaced for the terminal, if the target MM entity may further determine whether a user plane function needs to be reselected for the terminal, and if yes, the target MM entity may instruct the terminal to initiate a session context update procedure by using a tracking area update accept response.

In one embodiment, in this embodiment, magnitude of operation numbers does not limit an execution sequence, and the execution sequence of the operations may be appropriately adjusted. This is not limited in this embodiment of this application.

As can be learned, a terminal location and a session in a tracking area update procedure of the terminal are updated in a scenario in which an MM entity and an SM entity are separated.

Figure 14:
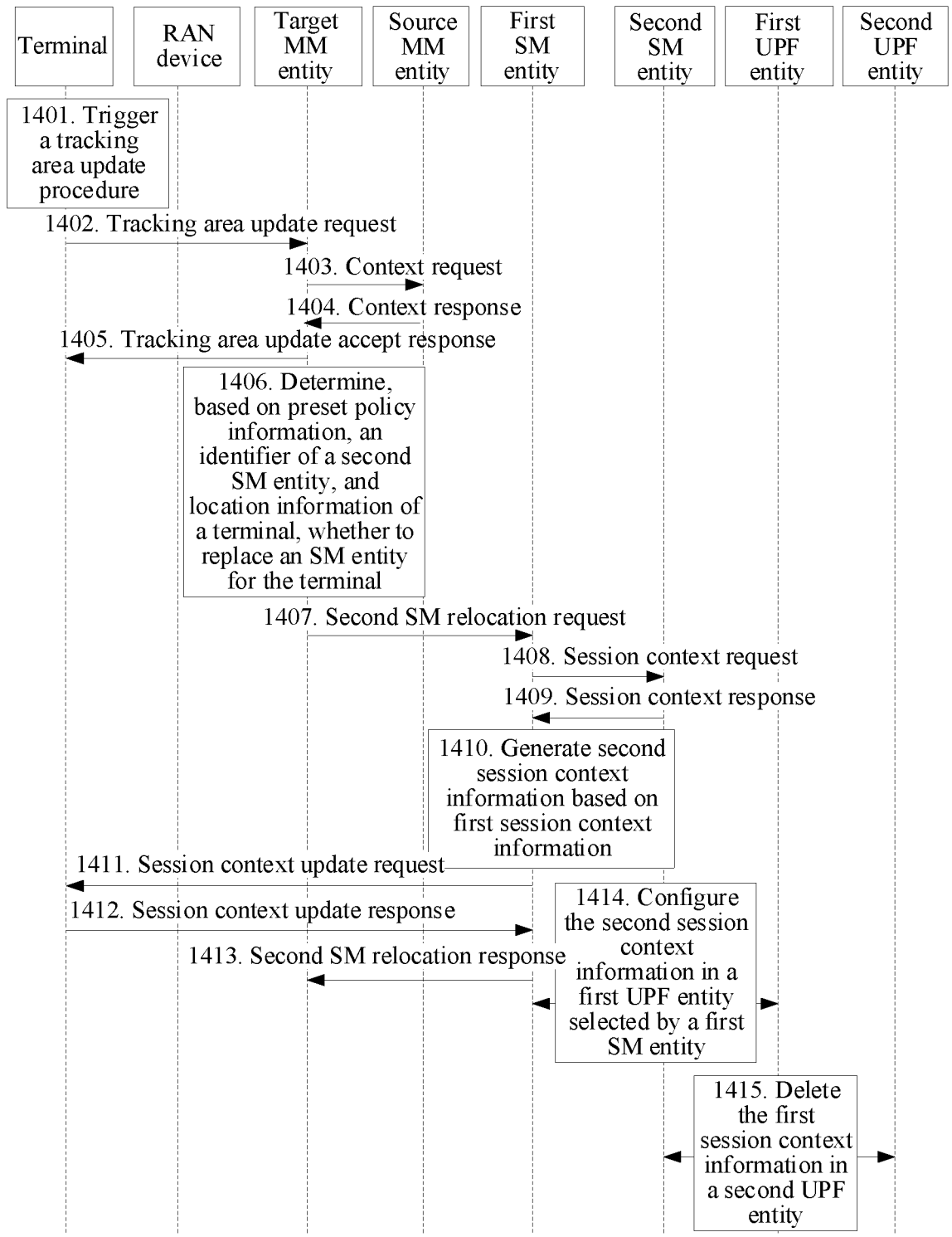
FIG. 14 is a schematic flowchart of Embodiment 13 of a session management method according to the present disclosure.

FIG. 14 is a schematic flowchart of Embodiment 13 of a session management method according to the present disclosure. Based on the foregoing embodiment, as shown in FIG. 14, the method in this embodiment may include the following operations.

Operation 1401. A terminal triggers a tracking area update procedure.

Operation 1402. The terminal sends a tracking area update request to a target MM entity.

In one embodiment, the tracking area update request includes an identifier of the terminal. In one embodiment, the tracking area update request may alternatively include an identifier of a second SM entity.

Operation 1403. The target MM entity sends a context request to a source MM entity.

Operation 1404. The source MM entity returns a context response to the target MM entity. In one embodiment, the context response includes MM context information.

Operation 1405. The target MM entity returns a tracking area update response to the terminal.

Operation 1406. The target MM entity determines, based on preset policy information, an identifier of a second SM entity, and location information of the terminal, whether to replace an SM entity for the terminal, and if yes, selects a first SM entity based on the preset policy information, and performs operation 1407.

In one embodiment, when the tracking area update request does not include the identifier of the second SM entity but includes the identifier of the terminal, the target MM entity may obtain the identifier of the second SM entity through parsing based on the identifier of the terminal.

Operation 1407. The target MM entity sends a second SM relocation request to the first SM entity.

In one embodiment, the second SM relocation request includes the identifier of the terminal. In one embodiment, the first SM entity may obtain the identifier of the second SM entity through parsing based on the identifier of the terminal. Alternatively, in one embodiment, the second SM relocation request includes the identifier of the second SM entity. Certainly, the first SM entity may alternatively obtain the identifier of the second SM entity in another manner. This is not limited in this embodiment.

Operation 1408. The first SM entity sends a session context request to the second SM entity.

Operation 1409. The second SM entity returns a session context response to the first SM entity. In one embodiment, the session context response includes first session context information.

Operation 1410. The first SM entity generates second session context information based on the first session context information. In one embodiment, the first SM entity further allocates a new IP address.

Operation 1411. The first SM entity sends a session context update request to the terminal. In one embodiment, the session context update request includes the second session context information.

Operation 1412. The terminal sends a session context update response to the first SM entity.

Operation 1413. The first SM entity returns a second session management SM relocation response to the target MM entity.

Operation 1414. The first SM entity configures the second session context information in a first UPF entity selected by the first SM entity.

Operation 1415. The second SM entity deletes the first session context information in a second UPF entity.

In one embodiment, in operation 1406, when the target MM entity determines, based on the preset policy information, the identifier of the second SM entity, and the location information of the terminal, that no SM entity needs to be replaced for the terminal, if the target MM entity may further determine whether a UPF needs to be reselected for the terminal, and if yes, the target MM entity requests the second SM entity to initiate a session context update procedure for the terminal.

In one embodiment, in this embodiment, magnitude of operation numbers does not limit an execution sequence, and the execution sequence of the operations may be appropriately adjusted. This is not limited in this embodiment of this application.

As can be learned, a terminal location and a session in a tracking area update procedure of the terminal are updated in a scenario in which an MM entity and an SM entity are separated.

Figure 15:
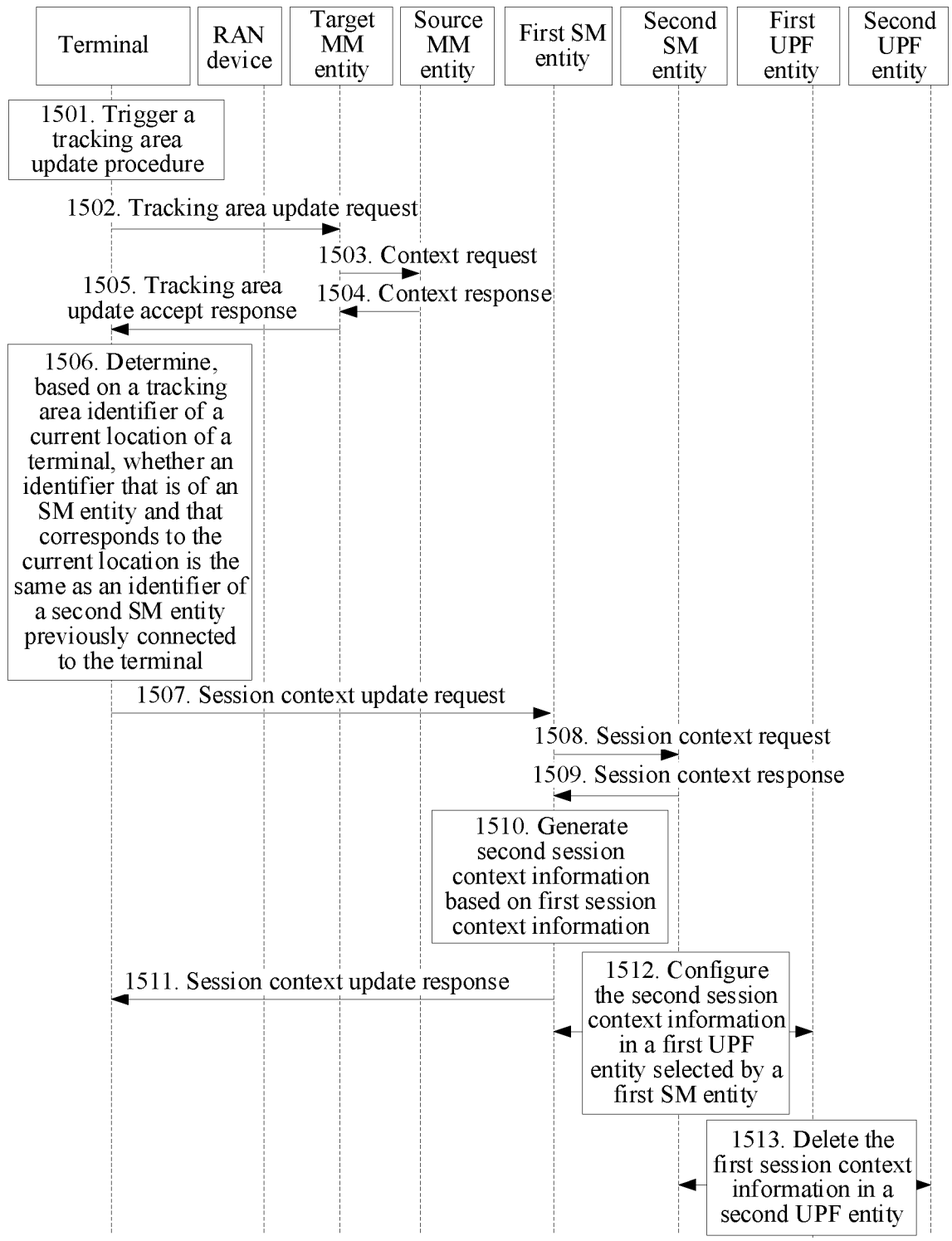
FIG. 15 is a schematic flowchart of Embodiment 14 of a session management method according to the present disclosure.

FIG. 15 is a schematic flowchart of Embodiment 14 of a session management method according to the present disclosure. Based on the foregoing embodiment, as shown in FIG. 15, the method in this embodiment may include the following operations.

Operation 1501. A terminal triggers a tracking area update procedure.

Operation 1502. The terminal sends a tracking area update request to a target MM entity.

Operation 1503. The target MM entity sends a context request to a source MM entity.

Operation 1504. The source MM entity returns a context response to the target MM entity. In one embodiment, the context response includes MM context information.

Operation 1505. The target MM entity returns a tracking area update accept response to the terminal.

Operation 1506. The terminal determines, based on a tracking area identifier of a current location of the terminal, whether an identifier that is of an SM entity and that corresponds to the current location is the same as an identifier of a second SM entity previously connected to the terminal, and if no, performs operation 1507.

In one embodiment, it is determined, based on the currently detected tracking area identifier, whether the current location falls within a service range of the second SM entity previously connected to the terminal. For example, an identifier that is of an SM entity (for example, an identifier of a first SM entity) and that corresponds to the current location of the terminal is determined based on a formula 1 (the tracking area identifier=an MCC+an MNC+SM_ID+a TAC). If the identifier that is of the SM entity and that corresponds to the current location of the terminal is not the identifier of the second SM entity previously connected to the terminal, the terminal triggers a session context update procedure.

Operation 1507. The terminal sends a session context update request.

In one embodiment, the session context update request may be carried in a third RRC request message. In one embodiment, the session context update request carries an identifier of the terminal. In one embodiment, the session context update request may alternatively carry the identifier of the second SM entity. Alternatively, in one embodiment, the third RRC request message may carry the identifier of the first SM entity, so that an RAN device sends the session context update request to the first SM entity based on the identifier of the first SM entity.

In one embodiment, the session context update request may be carried in a first RRC request message. In one embodiment, the session context update request carries an identifier of the terminal. In one embodiment, the session context update request may alternatively carry the identifier of the second SM entity. Alternatively, in one embodiment, the first RRC request message may carry the identifier of the second SM entity, so that when an RAN device determines, based on preset policy information and the identifier of the second SM entity, that the RAN device cannot be connected to the second SM entity, the RAN device selects a first SM entity based on the preset policy information, and sends the session context update request to the first SM entity.

Operation 1508. A first SM entity sends a session context request to the second SM entity.

In one embodiment, the first SM entity obtains the identifier of the second SM entity through parsing based on the identifier of the terminal included in the session context update request. Alternatively, in one embodiment, the first SM entity obtains the identifier of the second SM entity based on the session context update request carrying the identifier of the second SM entity. Certainly, the first SM entity may alternatively obtain the identifier of the second SM entity in another manner. This is not limited in this embodiment.

Operation 1509. The second SM entity returns a session context response to the first SM entity. In one embodiment, the session context response includes first session context information.

Operation 1510. The first SM entity generates second session context information based on the first session context information. In one embodiment, the first SM entity further allocates a new IP address.

Operation 1511. The first SM entity sends a session context update response to the terminal. In one embodiment, the session context update response includes the second session context information.

Operation 1512. The first SM entity configures the second session context information in a first UPF entity selected by the first SM entity.

Operation 1513. The second SM entity deletes the first session context information in a second UPF entity.

In one embodiment, when the RAN device can sense a plurality of UPFs, the RAN device may broadcast an identifier of a current UPF in a broadcast message. If identifiers that are of all UPFs and that are already stored in the terminal do not include the identifier of the current UPF broadcast in the broadcast message, the terminal initiates the session context update procedure.

In one embodiment, in operation 1507, another network function entity, such as a slice selection function (SSF) entity, may also participate in "selecting, by an RAN device, a first SM entity based on preset policy information when the RAN device determines, based on the preset policy information and the identifier of the second SM entity, that the RAN device cannot be connected to the second SM entity".

In one embodiment, in this embodiment, magnitude of operation numbers does not limit an execution sequence, and the execution sequence of the operations may be appropriately adjusted. This is not limited in this embodiment of this application.

As can be learned, a terminal location and a session in a tracking area update procedure of the terminal are updated in a scenario in which an MM entity and an SM entity are separated.

Figure 16:
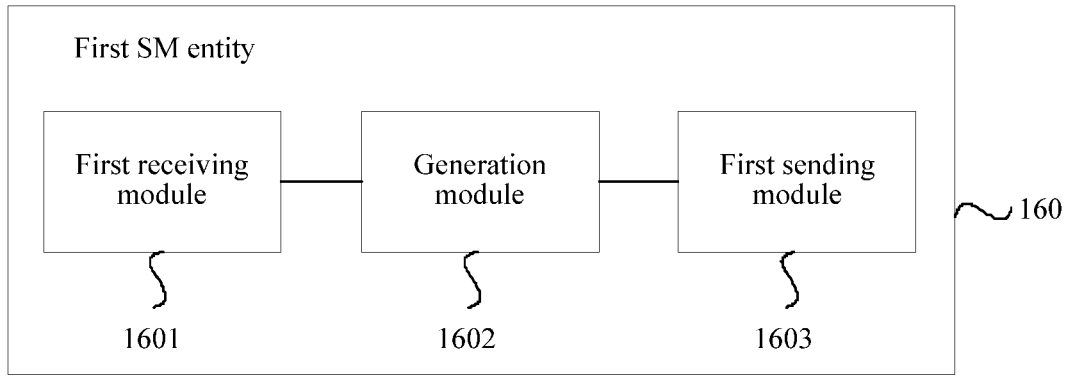
FIG. 16 is a schematic structural diagram of Embodiment 1 of a first SM entity according to the present disclosure.

FIG. 16 is a schematic structural diagram of Embodiment 1 of a first SM entity according to the present disclosure. As shown in FIG. 16, the first SM entity 160 provided in this embodiment includes:

a first receiving module 1601, configured to receive first session context information from a second SM entity;

a generation module 1602, configured to generate second session context information based on the first session context information; and a first sending module 1603, configured to send the second session context information to a terminal.

In one embodiment, the first SM entity 160 further includes:

a second sending module, configured to send a session context request to the second SM entity, where the session context request includes an identifier of the terminal.

In one embodiment, the first SM entity 160 further includes:

a second receiving module, configured to receive a session context update request from the terminal, where the session context update request includes the identifier of the terminal and/or an identifier of the second SM entity.

In one embodiment, the first receiving module 1601 is specifically configured to receive a first SM relocation request from the second SM entity, where the first SM relocation request includes the first session context information.

In one embodiment, the first SM entity 160 further includes:

a third receiving module, configured to receive a second SM relocation request from a target mobility management (MM) entity, where the second SM relocation request includes the identifier of the terminal.

The first SM entity provided in this embodiment may be configured to perform the technical solutions of Embodiment 1 and Embodiment 7 to Embodiment 14 of the foregoing session management method of the present disclosure, and their implementation principles and technical effects are similar. Details are not described herein again.

Figure 17:
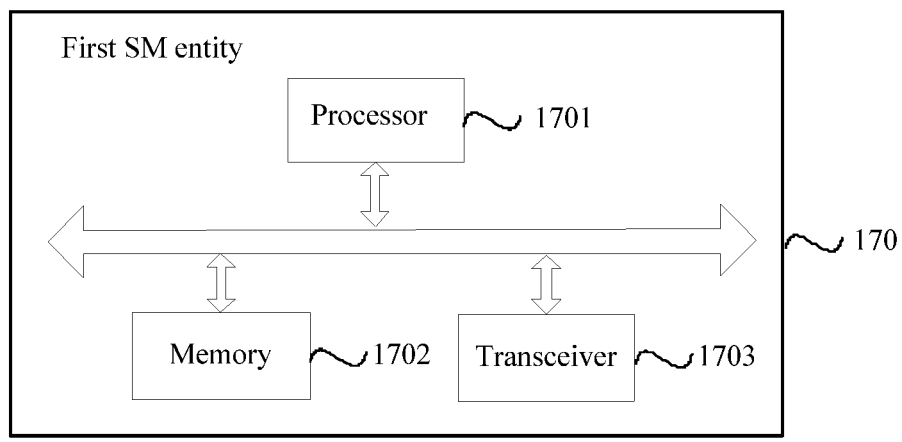
FIG. 17 is a schematic structural diagram of Embodiment 2 of a first SM entity according to the present disclosure.

FIG. 17 is a schematic structural diagram of Embodiment 2 of a first SM entity according to the present disclosure. As shown in FIG. 17, the first SM entity 170 provided in this embodiment may include a processor 1701 and a memory 1702. The first SM entity 170 may further include a transceiver 1703, and both the memory 1702 and the transceiver 1703 are connected to the processor 1701. The memory 1702 is configured to store an executable instruction, the transceiver 1703 is configured to receive and send data or information, and the processor 1701 is configured to execute the executable instruction in the memory 1702, so that the first SM entity 170 performs the following operations:

receiving first session context information from a second SM entity;

generating second session context information based on the first session context information; and sending the second session context information to a terminal.

In one embodiment, before the receiving first session context information from a second SM entity, the following operation is further included:

sending a session context request to the second SM entity, where the session context request includes an identifier of the terminal.

In one embodiment, before the receiving first session context information from a second SM entity, the following operation is further included:

receiving a session context update request from the terminal, where the session context update request includes the identifier of the terminal and/or an identifier of the second SM entity.

In one embodiment, the receiving first session context information from a second SM entity includes:

receiving a first SM relocation request from the second SM entity, where the first SM relocation request includes the first session context information.

In one embodiment, before the receiving first session context information from a second SM entity, the following operation is further included:

receiving a second SM relocation request from a target mobility management (MM) entity, where the second SM relocation request includes the identifier of the terminal.

In one embodiment, a session management method is applied to a tracking area update procedure.

The first SM entity provided in this embodiment may be configured to perform the technical solutions of Embodiment 1 and Embodiment 7 to Embodiment 14 of the foregoing session management method of the present disclosure, and their implementation principles and technical effects are similar. Details are not described herein again.

Figure 18:
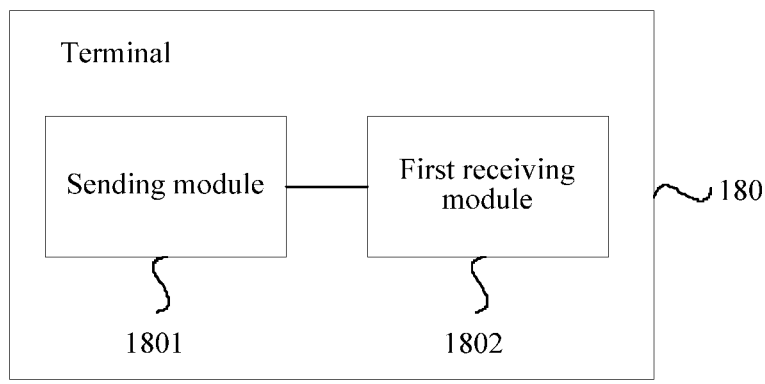
FIG. 18 is a schematic structural diagram of Embodiment 1 of a terminal according to the present disclosure.

FIG. 18 is a schematic structural diagram of Embodiment 1 of a terminal according to the present disclosure. As shown in FIG. 18, the terminal 180 provided in this embodiment includes:

a sending module 1801, configured to send a session context update request to a first session management SM entity, where the session context update request includes an identifier of the terminal; and a first receiving module 1802, configured to: receive second session context information from a first SM entity and store the second session context information, where the second session context information is new session context information generated by the first SM entity based on first session context information obtained from a second SM entity.

In one embodiment, the terminal 180 further includes:

an obtaining module, configured to obtain a tracking area identifier of a location of the terminal, where the tracking area identifier includes an identifier that is of the first SM entity and that corresponds to the current location; and a determining module, configured to determine, based on the tracking area identifier, that the identifier of the first SM entity is not an identifier of the second SM entity previously connected to the terminal.

In one embodiment, the terminal 180 further includes:

a second receiving module, configured to receive an identifier of the first SM entity from a radio access network (RAN) device or a target mobility management (MM) entity.

In one embodiment, the terminal 180 further includes:

a triggering module, configured to trigger a tracking area update procedure.

The terminal provided in this embodiment may be configured to perform the technical solutions of Embodiment 2, Embodiment 7, Embodiment 8, Embodiment 11, Embodiment 12, and Embodiment 14 of the foregoing session management method of the present disclosure, and their implementation principles and technical effects are similar. Details are not described herein again.

Figure 19:
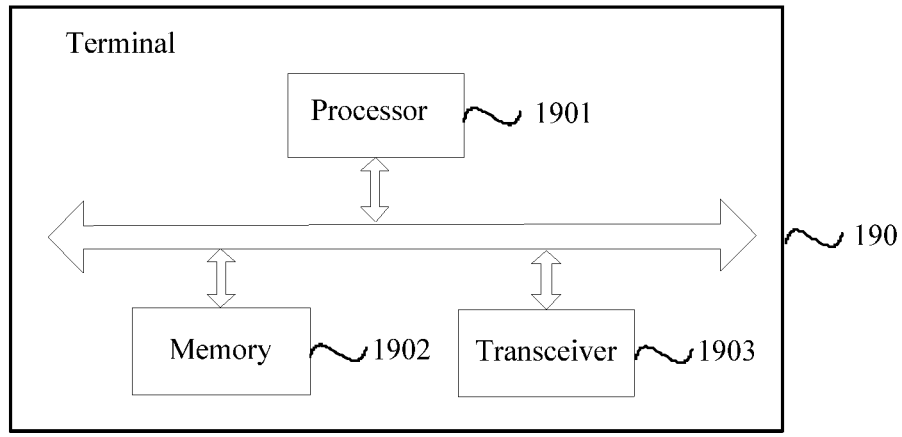
FIG. 19 is a schematic structural diagram of Embodiment 2 of a terminal according to the present disclosure.

FIG. 19 is a schematic structural diagram of Embodiment 2 of a terminal according to the present disclosure. As shown in FIG. 19, the terminal 190 provided in this embodiment may include a processor 1901 and a memory 1902. The terminal 190 may further include a transceiver 1903, and both the memory 1902 and the transceiver 1903 are connected to the processor 1901. The memory 1902 is configured to store an executable instruction, the transceiver 1903 is configured to receive and send data or information, and the processor 1901 is configured to execute the executable instruction in the memory 1902, so that the terminal 190 performs the following operations:

sending a session context update request to a first session management SM entity, where the session context update request includes an identifier of the terminal; and receiving second session context information from a first SM entity and storing the second session context information, where the second session context information is new session context information generated by the first SM entity based on first session context information obtained from a second SM entity.

In one embodiment, before the sending a session context update request to a first SM entity, the following operations are further included:

obtaining a tracking area identifier of a location of the terminal, where the tracking area identifier includes an identifier that is of the first SM entity and that corresponds to the current location; and determining, based on the tracking area identifier, that the identifier of the first SM entity is not an identifier of the second SM entity previously connected to the terminal.

In one embodiment, before the sending a session context update request to a first SM entity, the following operation is further included:

receiving an identifier of the first SM entity from a radio access network (RAN) device.

In one embodiment, before the sending a session context update request to a first SM entity, the following operation is further included:

receiving an identifier of the first SM entity from a target mobility management (MM) entity.

In one embodiment, before the sending a session context update request to a first SM entity, the following operation is further included:

triggering a tracking area update procedure.

The terminal provided in this embodiment may be configured to perform the technical solutions of Embodiment 2, Embodiment 7, Embodiment 8, Embodiment 11, Embodiment 12, and Embodiment 14 of the foregoing session management method of the present disclosure, and their implementation principles and technical effects are similar. Details are not described herein again.

Figure 20:
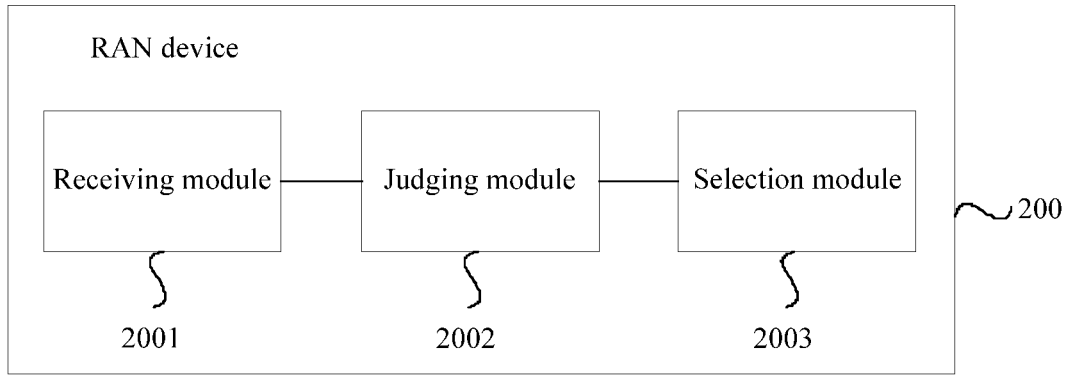
FIG. 20 is a schematic structural diagram of Embodiment 1 of an RAN device according to the present disclosure.

FIG. 20 is a schematic structural diagram of Embodiment 1 of an RAN device according to the present disclosure. As shown in FIG. 20, the RAN device 200 provided in this embodiment includes:

a receiving module 2001, configured to receive an identifier of a second session management SM entity from a terminal;

a judging module 2002, configured to determine, based on preset policy information and the identifier of the second SM entity, whether to replace an SM entity for the terminal, where the second SM entity is an SM entity for maintaining historical session context information of the terminal; and a selection module 2003, configured to select a first SM entity based on the preset policy information if the judging module 2002 determines that an SM entity needs to be replaced for the terminal.

In one embodiment, the receiving module 2001 is specifically configured to receive a first RRC request message from the terminal, where the first RRC request message includes a session context update request and the identifier of the second SM entity.

In one embodiment, the RAN device 200 further includes:

a first sending module, configured to send the session context update request to the first SM entity.

In one embodiment, the receiving module 2001 is specifically configured to receive a second RRC request message from the terminal, where the second RRC request message includes the identifier of the second SM entity.

In one embodiment, the RAN device 200 further includes:

a second sending module, configured to send an identifier of the first SM entity to the terminal, so that the terminal sends a session context update request to the first SM entity based on the identifier of the first SM entity.

The RAN device provided in this embodiment may be configured to perform the technical solutions of Embodiment 3, Embodiment 7, Embodiment 8, and Embodiment 11 of the foregoing session management method of the present disclosure, and their implementation principles and technical effects are similar. Details are not described herein again.

Figure 21:
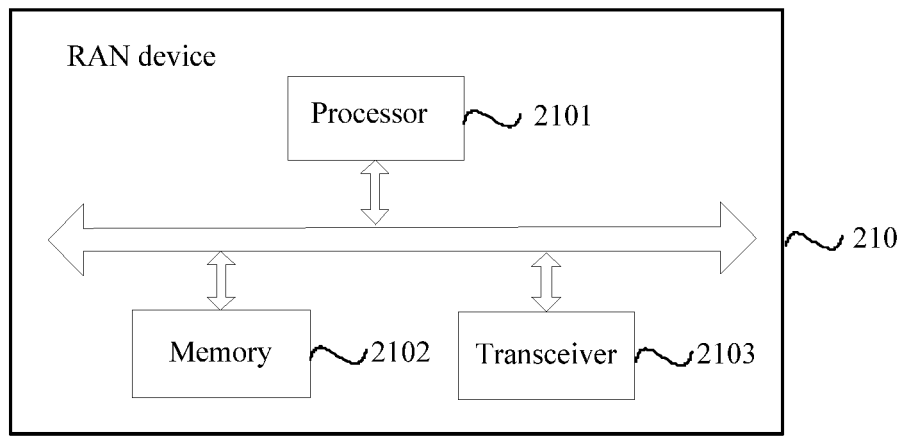
FIG. 21 is a schematic structural diagram of Embodiment 2 of an RAN device according to the present disclosure.

FIG. 21 is a schematic structural diagram of Embodiment 2 of an RAN device according to the present disclosure. As shown in FIG. 21, the RAN device 210 provided in this embodiment may include a processor 2101 and a memory 2102. The RAN device 210 may further include a transceiver 2103, and both the memory 2102 and the transceiver 2103 are connected to the processor 2101. The memory 2102 is configured to store an executable instruction, the transceiver 2103 is configured to receive and send data or information, and the processor 2101 is configured to execute the executable instruction in the memory 2102, so that the RAN device 210 performs the following operations:

receiving an identifier of a second session management SM entity from a terminal;

determining, based on preset policy information and the identifier of the second SM entity, whether to replace an SM entity for the terminal, where the second SM entity is an SM entity for maintaining historical session context information of the terminal; and if yes, selecting a first SM entity based on the preset policy information.

In one embodiment, the receiving an identifier of a second SM entity from a terminal includes:

receiving a first RRC request message from the terminal, where the first RRC request message includes a session context update request and the identifier of the second SM entity.

In one embodiment, after the selecting a first SM entity based on the preset policy information, the following operation is further included:

sending the session context update request to the first SM entity.

In one embodiment, the receiving an identifier of a second SM entity from a terminal includes:

receiving a second RRC request message from the terminal, where the second RRC request message includes the identifier of the second SM entity.

In one embodiment, after the selecting a first SM entity based on the preset policy information, the following operation is further included:

sending an identifier of the first SM entity to the terminal, so that the terminal sends a session context update request to the first SM entity based on the identifier of the first SM entity.

The RAN device provided in this embodiment may be configured to perform the technical solutions of Embodiment 3, Embodiment 7, Embodiment 8, and Embodiment 11 of the foregoing session management method of the present disclosure, and their implementation principles and technical effects are similar. Details are not described herein again.

Figure 22:
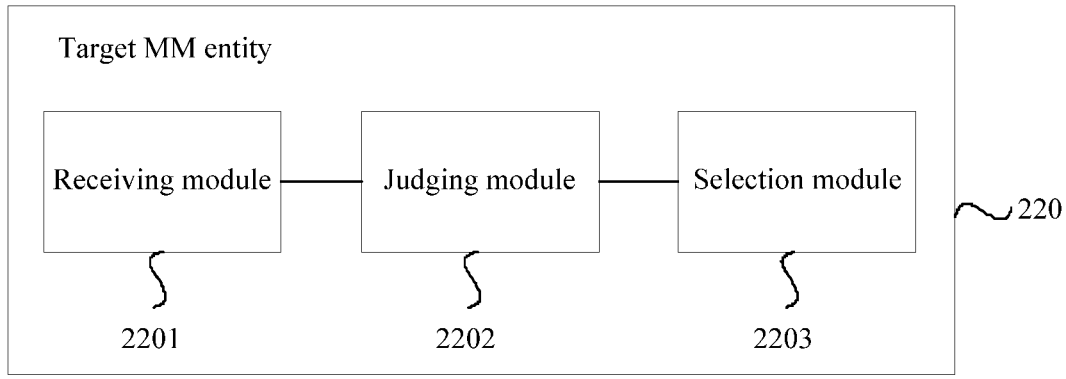
FIG. 22 is a schematic structural diagram of Embodiment 1 of a target MM entity according to the present disclosure.

FIG. 22 is a schematic structural diagram of Embodiment 1 of a target MM entity according to the present disclosure. As shown in FIG. 22, the target MM entity 220 provided in this embodiment includes:

a receiving module 2201, configured to receive a tracking area update request from a terminal;

a judging module 2202, configured to determine, based on preset policy information, an identifier of a second session management SM entity, and location information of the terminal, whether to replace an SM entity for the terminal, where the second SM entity is an SM entity for maintaining historical session context information of the terminal; and a selection module 2203, configured to select a first SM entity based on the preset policy information if the judging module 2202 determines that an SM entity needs to be replaced for the terminal.

In one embodiment, the target MM entity 220 further includes:

a first sending module, configured to send an identifier of the first SM entity to the terminal, so that the terminal sends a session context update request to the first SM entity based on the identifier of the first SM entity; or a second sending module, configured to send a second SM relocation request to the first SM entity, so that the first SM entity requests to obtain first session context information from the second SM entity, where the second SM relocation request includes an identifier of the terminal.

The target MM entity provided in this embodiment may be configured to perform the technical solutions of Embodiment 4, Embodiment 12, and Embodiment 13 of the foregoing session management method of the present disclosure, and their implementation principles and technical effects are similar. Details are not described herein again.

Figure 23:
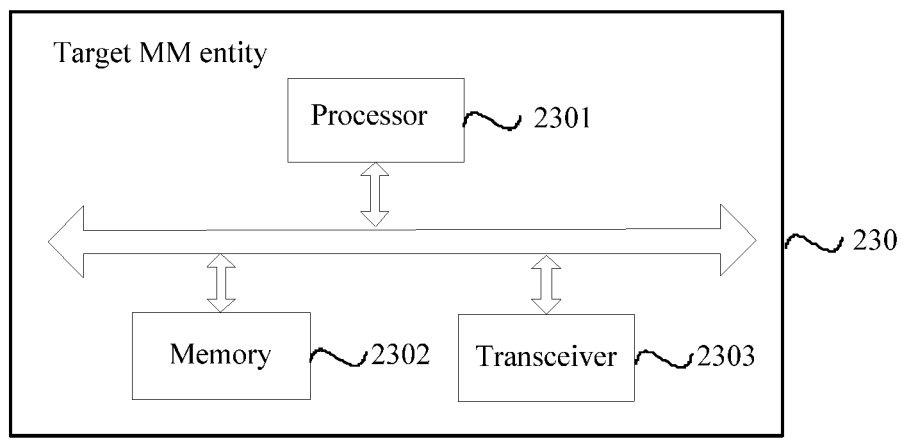
FIG. 23 is a schematic structural diagram of Embodiment 2 of a target MM entity according to the present disclosure.

FIG. 23 is a schematic structural diagram of Embodiment 2 of a target MM entity according to the present disclosure. As shown in FIG. 23, the target MM entity 230 provided in this embodiment may include a processor 2301 and a memory 2302. The target MM entity 230 may further include a transceiver 2303, and both the memory 2302 and the transceiver 2303 are connected to the processor 2301. The memory 2302 is configured to store an executable instruction, the transceiver 2303 is configured to receive and send data or information, and the processor 2301 is configured to execute the executable instruction in the memory 2302, so that the target MM entity 230 performs the following operations:

receiving a tracking area update request from a terminal;

determining, based on preset policy information, an identifier of a second session management SM entity, and location information of the terminal, whether to replace an SM entity for the terminal, where the second SM entity is an SM entity for maintaining historical session context information of the terminal; and if yes, selecting a first SM entity based on the preset policy information.

In one embodiment, after the selecting a first SM entity based on the preset policy information, the following operation is further included:

sending an identifier of the first SM entity to the terminal, so that the terminal sends a session context update request to the first SM entity based on the identifier of the first SM entity; or sending a second SM relocation request to the first SM entity, so that the first SM entity requests to obtain first session context information from the second SM entity, where the second SM relocation request includes an identifier of the terminal.

The target MM entity provided in this embodiment may be configured to perform the technical solutions of Embodiment 4, Embodiment 12, and Embodiment 13 of the foregoing session management method of the present disclosure, and their implementation principles and technical effects are similar. Details are not described herein again.

Figure 24:
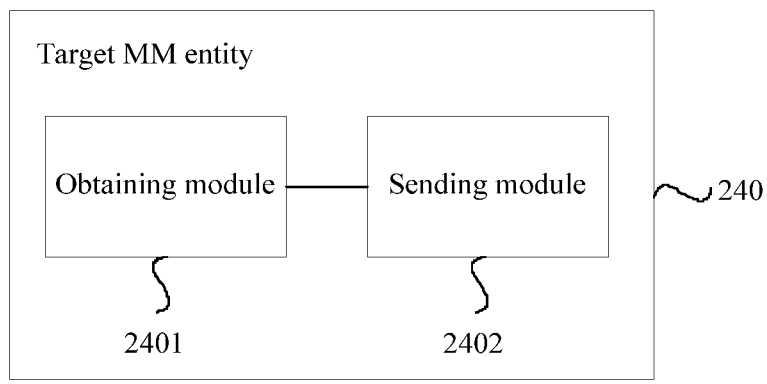
FIG. 24 is a schematic structural diagram of Embodiment 3 of a target MM entity according to the present disclosure.

FIG. 24 is a schematic structural diagram of Embodiment 3 of a target MM entity according to the present disclosure. As shown in FIG. 24, the target MM entity 240 provided in this embodiment includes:

an obtaining module 2401, configured to obtain location information of a terminal; and a sending module 2402, configured to send the location information of the terminal to a second session management SM entity, so that the second SM entity determines, based on preset policy information and the location information of the terminal, whether to replace an SM entity for the terminal, where the second SM entity is an SM entity for maintaining historical session context information of the terminal.

In one embodiment, the target MM entity 240 further includes:

a receiving module, configured to receive SM subscription information from a source MM entity, where the SM subscription information is: if the terminal triggers a tracking area update procedure, notifying the location information of the terminal to the second SM entity.

In one embodiment, the sending module 2402 is specifically configured to send the location information of the terminal to a source MM entity, so that the source MM entity forwards the location information of the terminal to the second SM entity.

The target MM entity provided in this embodiment may be configured to perform the technical solutions of Embodiment 5, Embodiment 9, and Embodiment 10 of the foregoing session management method of the present disclosure, and their implementation principles and technical effects are similar. Details are not described herein again.

Figure 25:
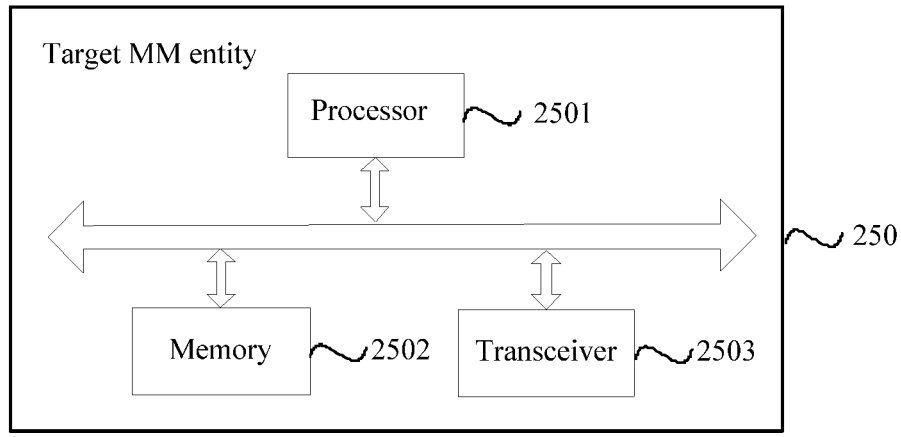
FIG. 25 is a schematic structural diagram of Embodiment 4 of a target MM entity according to the present disclosure.

FIG. 25 is a schematic structural diagram of Embodiment 4 of a target MM entity according to the present disclosure. As shown in FIG. 25, the target MM entity 250 provided in this embodiment may include a processor 2501 and a memory 2502. The target MM entity 250 may further include a transceiver 2503, and both the memory 2502 and the transceiver 2503 are connected to the processor 2501. The memory 2502 is configured to store an executable instruction, the transceiver 2503 is configured to receive and send data or information, and the processor 2501 is configured to execute the executable instruction in the memory 2502, so that the target MM entity 250 performs the following operations:

obtaining location information of a terminal; and sending the location information of the terminal to a second session management SM entity, so that the second SM entity determines, based on preset policy information and the location information of the terminal, whether to replace an SM entity for the terminal, where the second SM entity is an SM entity for maintaining historical session context information of the terminal.

In one embodiment, before the sending the location information of the terminal to a second SM entity, the following operation is further included:

receiving SM subscription information from a source MM entity, where the SM subscription information is: if the terminal triggers a tracking area update procedure, notifying the location information of the terminal to the second SM entity.

In one embodiment, the sending the location information of the terminal to a second SM entity includes:

sending the location information of the terminal to the source MM entity, so that the source MM entity forwards the location information of the terminal to the second SM entity.

The target MM entity provided in this embodiment may be configured to perform the technical solutions of Embodiment 5, Embodiment 9, and Embodiment 10 of the foregoing session management method of the present disclosure, and their implementation principles and technical effects are similar. Details are not described herein again.

Figure 26:
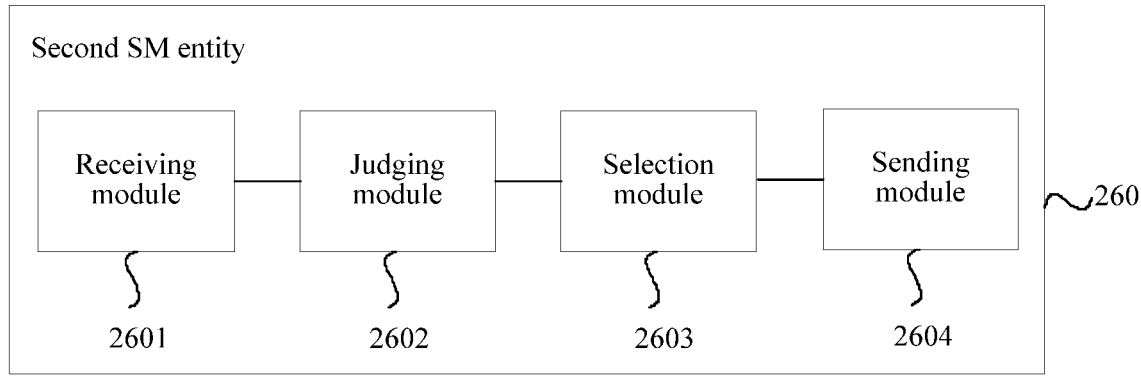
FIG. 26 is a schematic structural diagram of Embodiment 1 of a second SM entity according to the present disclosure.

FIG. 26 is a schematic structural diagram of Embodiment 1 of a second SM entity according to the present disclosure. As shown in FIG. 26, the second SM entity 260 provided in this embodiment includes:

a receiving module 2601, configured to receive an identifier of a terminal and location information of the terminal from a mobility management (MM) entity, where the MM entity is a source MM entity or a target MM entity;

a judging module 2602, configured to determine, based on preset policy information and the location information of the terminal, whether to replace an SM entity for the terminal;

a selection module 2603, configured to select a first SM entity based on the preset policy information if the judging module 2602 determines that an SM entity needs to be replaced for the terminal; and a sending module 2604, configured to send first session context information to the first SM entity, so that the first SM entity generates second session context information based on the first session context information.

The second SM entity provided in this embodiment may be configured to perform the technical solutions of Embodiment 6, Embodiment 9, and Embodiment 10 of the foregoing session management method of the present disclosure, and their implementation principles and technical effects are similar. Details are not described herein again.

Figure 27:
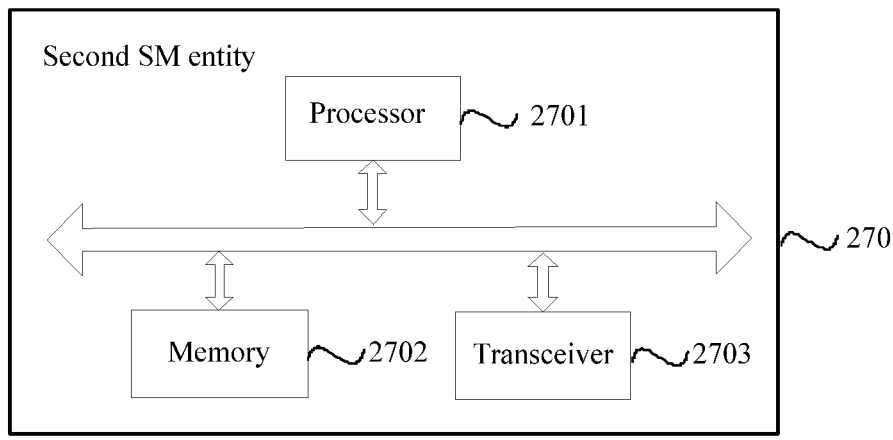
FIG. 27 is a schematic structural diagram of Embodiment 2 of a second SM entity according to the present disclosure.

FIG. 27 is a schematic structural diagram of Embodiment 2 of a second SM entity according to the present disclosure. As shown in FIG. 27, the second SM entity 270 provided in this embodiment may include a processor 2701 and a memory 2702. The second SM entity 270 may further include a transceiver 2703, and both the memory 2702 and the transceiver 2703 are connected to the processor 2701. The memory 2702 is configured to store an executable instruction, the transceiver 2703 is configured to receive and send data or information, and the processor 2701 is configured to execute the executable instruction in the memory 2702, so that the second SM entity 270 performs the following operations:

receiving an identifier of a terminal and location information of the terminal from mobility management (MM) entity, where the MM entity is a source MM entity or a target MM entity;

determining, based on preset policy information and the location information of the terminal, whether to replace an SM entity for the terminal; and if yes, selecting, by the second SM entity, a first SM entity based on the preset policy information, and sending first session context information to the first SM entity, so that the first SM entity generates second session context information based on the first session context information.

The second SM entity provided in this embodiment may be configured to perform the technical solutions of Embodiment 6, Embodiment 9, and Embodiment 10 of the foregoing session management method of the present disclosure, and their implementation principles and technical effects are similar. Details are not described herein again.

In the several embodiments provided in the present disclosure, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the operations of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented based on a requirement, that is, an inner structure of an apparatus is divided into different function modules to implement all or some of the functions described above. For a detailed working process of the foregoing apparatus, reference may be made to a corresponding process in the foregoing method embodiments, and details are not described herein again.

Persons of ordinary skill in the art may understand that various numbers such as first and second in this specification are merely used for distinguishing for ease of description, but are not used to limit the scope of the embodiments of the present disclosure.

Persons of ordinary skill in the art may understand that sequence numbers of the foregoing processes do not mean execution sequences in various embodiments of this application. The execution sequences of the processes should be determined based on functions and internal logic of the processes, and should not be construed as any limitation on the implementation processes of the embodiments of the present disclosure.

Persons of ordinary skill in the art may understand that all or some of the operations of the method embodiments may be implemented by a program instructing relevant hardware. The program may be stored in a computer-readable storage medium. When the program is executed, the operations of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A session management method, comprising:
receiving, by a first session management (SM) entity, first session context information from a second SM entity;
generating, by the first SM entity, second session context information based on the first session context information;
sending, by the first SM entity, the second session context information to a terminal,
wherein before the receiving, by a first SM entity, first session context information from a second SM entity, the method further comprises:
sending, by the first SM entity, a session context request to the second SM entity, wherein the session context request comprises an identifier of the terminal, and receiving, by the first SM entity, a second SM relocation request from a separate target mobility management MM entity, wherein the second SM relocation request comprises the identifier of the terminal.

2. The method according to claim 1, wherein before the receiving, by a first SM entity, first session context information from a second SM entity, the method further comprises:
receiving, by the first SM entity, a session context update request from the terminal, wherein the session context update request comprises the identifier of the terminal and/or an identifier of the second SM entity.

3. The method according to claim 1, wherein the receiving, by a first SM entity, first session context information from a second SM entity comprises:
receiving, by the first SM entity, a first SM relocation request from the second SM entity, wherein the first SM relocation request comprises the first session context information.

4. An apparatus comprising at least one hardware processor coupled with a non-transitory storage medium storing executable instructions; wherein the executable instructions, when executed by the processor, cause the processor to carry out a method comprising:
receiving, by a first session management (SM) entity, first session context information from a second SM entity;
generating, by the first SM entity, second session context information based on the first session context information;
sending, by the first SM entity, the second session context information to a terminal,
wherein before the receiving, by a first SM entity, first session context information from a second SM entity, the method further comprises:
sending, by the first SM entity, a session context request to the second SM entity, wherein the session context request comprises an identifier of the terminal, and receiving, by the first SM entity, a second SM relocation request from a separate target mobility management (MM) entity, wherein the second SM relocation request comprises the identifier of the terminal.

5. The apparatus according to claim 4, the method further comprising:

obtaining a tracking area identifier of a location of the terminal, wherein the tracking area identifier comprises an identifier that is of the first SM entity and that corresponds to a current location; and determining based on the tracking area identifier, that the identifier of the first SM entity is not an identifier of the second SM entity previously connected to the terminal.

6. The apparatus terminal according to claim 4, the method further comprising:

receiving an identifier of the first SM entity from a radio access network (RAN) device or a target MM entity before the terminal sends a session context update request to a first SM entity.

7. The apparatus according to claim 4, wherein before the receiving, by a first SM entity, first session context information from a second SM entity, the method further comprising:

receiving, by the first SM entity, a session context update request from the terminal, wherein the session context update request comprises the identifier of the terminal and/or an identifier of the second SM entity.

* * * * *